US 8,077,764 B2

(12) United States Patent
Eleftheriou et al.

(10) Patent No.: US 8,077,764 B2
(45) Date of Patent: Dec. 13, 2011

(54) 16-STATE ADAPTIVE NOISE PREDICTIVE MAXIMUM-LIKELIHOOD DETECTION SYSTEM

(75) Inventors: Evangelos S. Eleftheriou, Rueschlikon (CH); Robert A. Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/360,777

(22) Filed: Jan. 27, 2009

(65) Prior Publication Data

US 2010/0189169 A1    Jul. 29, 2010

(51) Int. Cl.
*H03H 7/30* (2006.01)
(52) U.S. Cl. .................. 375/229; 375/341; 375/350
(58) Field of Classification Search .................. 375/341, 375/345, 350, 340, 229, 354
See application file for complete search history.

(56) References Cited

U.S. PATENT DOCUMENTS

| 5,060,088 | A | | 10/1991 | Dolivo et al. | |
|---|---|---|---|---|---|
| 5,784,415 | A | | 7/1998 | Chevillat et al. | |
| 6,158,027 | A | * | 12/2000 | Bush et al. | 714/709 |
| 6,201,840 | B1 | | 3/2001 | Rub et al. | |
| 6,411,224 | B1 | | 6/2002 | Wilson et al. | |
| 6,460,150 | B1 | * | 10/2002 | Cideciyan et al. | 714/709 |
| 6,516,443 | B1 | * | 2/2003 | Zook | 714/792 |
| 6,557,061 | B1 | * | 4/2003 | Hindie et al. | 710/72 |
| 6,560,276 | B1 | * | 5/2003 | Long et al. | 375/222 |
| 6,901,119 | B2 | | 5/2005 | Cideciyan et al. | |
| 6,937,551 | B2 | | 8/2005 | Miyashita et al. | |
| 7,006,564 | B2 | | 2/2006 | Ling et al. | |
| 7,193,802 | B2 | | 3/2007 | Cideciyan et al. | |
| 2006/0174180 | A1 | | 8/2006 | Vityaev | |
| 2006/0176982 | A1 | | 8/2006 | Berman et al. | |
| 2007/0168408 | A1 | | 7/2007 | Skelton et al. | |
| 2008/0181342 | A1 | * | 7/2008 | Cho et al. | 375/347 |

OTHER PUBLICATIONS

Cideciyan, et al., "Noise Predictive Maximum Likelihood Detection Combined with Parity-Based Post-Processing;" IEEE Transactions on Magnetics, vol. 37, No. 2, Mar. 2001; pp. 714-720.
Kiriaki, et al., "A 160-MHz Analog Equalizer for Magnetic Disk Read Channels;" IEEE Journal of Solid-State Circuits, vol. 32, No. 11, Nov. 1997; pp. 1839-1850.
Kumar, et al., "Two-Dimensional Equalization: Theory and Applications to High Density Magnetic Recording;" IEEE Transactions on Communications, vol. 42, No. 2/3/4, Feb./Mar./Apr. 1994; pp. 386-395.

* cited by examiner

*Primary Examiner* — Emmanuel Bayard
(74) *Attorney, Agent, or Firm* — Dan Shifrin

(57) ABSTRACT

A 16-State adaptive NPML detector is provided for a tape drive which addresses weaknesses of a conventional fixed, 8-state EPR4 detector. Rather than having a fixed target channel, the detector is programmable to allow a range of target channels and can support "classical" partial response channels such as PR4 or EPR4 by programming predictor or whitening filter coefficients. In one embodiment, two filter coefficients may be set via XREG inputs or dynamically determined through the use of an LMS algorithm allowing the detector to adapt the predictor coefficients as data is being read. Another embodiment provides a detector for an EPR4 target in which the whitening filter has one coefficient. Components of the detection system include the detector itself, an LMS engine, a coefficient engine and a noise predictive or whitening filter. Coefficients from the LMS engine may be loaded or stored dynamically based upon conditions in the tape drive.

14 Claims, 23 Drawing Sheets

WHITENING FILTER

METRIC 0 STRUCTURE

METRIC 1 STRUCTURE

COMPARE & SELECT LOGIC

LMS ENGINE

LMS LOGIC

LMS PR4 TARGET & ERROR GENERATION

LMS ERROR FILTER

LMS TAP

COEFFICIENT ENGINE

WHITENING FILTER

METRIC 0 STRUCTURE

METRIC 1 STRUCTURE

LMS EPR4 TARGET ENGINE

Coefficient updating by the LMS algorithm: $w_1 \leftarrow w_1 - \alpha \, \tilde{e}_k \, e_{k-1}$

LMS LOGIC

LMS ERROR FILTER

COEFFICIENT ENGINE

16-STATE ADAPTIVE NOISE PREDICTIVE MAXIMUM-LIKELIHOOD DETECTION SYSTEM

RELATED APPLICATION DATA

The present application is related to commonly-assigned and co-pending U.S. application Ser. No. 11/054,060 (U.S. Publication No. 2006/0176982), entitled APPARATUS, SYSTEM AND METHOD FOR ASYMMETRIC MAXIMUM LIKELIHOOD DETECTION, filed on Feb. 9, 2005, which application is incorporated herein by reference in its entirety.

TECHNICAL FIELD

The present invention relates generally to reducing the number of errors in data that is read from magnetic tape and, in particular, to the use of a noise predictive maximum-likelihood detector

BACKGROUND ART

During a read process of a data storage device, a read head is typically passed over a data record recorded on a storage media in order to convert the recorded data into an analog signal. For example, in a magnetic tape drive, a magneto-resistive read head is passed over a data record that has been previously written as flux reversals on a magnetic tape. As the head is passed over the tape, the head converts the flux reversals into an electrical analog signal that represents the data originally stored on the magnetic tape.

An analog to digital converter ("ADC") periodically samples the analog signal and converts the sampled analog signal to a digital input signal and creates a digital waveform. The amplitude of the digital waveform is processed to form binary values. The data storage device, such as a magnetic media storage device, processes the digital waveform to reconstruct the data that was originally written to the tape and passes the data to a host device.

Because of noise in the read channel, a binary value corresponding to one or more digital input signals may be indeterminate. For example, one or more of the digital input signals may have a lower amplitude, which is corrupted by noise, increasing the difficulty of reconstructing the data and determining the binary value.

Storage devices such as magnetic tape drives frequently use a maximum-likelihood detector to reconstruct data from the digital waveform. Such a detector employs a plurality of states organized as a logical trellis. The trellis specifies allowable subsequent states for each state. For example, the trellis may specify that the detector may change from a first state to a second or a third state, but not to a fourth state. The detector thus changes from the first state to the second state or to the third state depending on a plurality of branch metrics. A branch metric for the current state is a function of branch metrics for previous states and of a current digital input signal. Thus, path metrics maintain a record of the detector's progression through previous states. The detector begins in an initial state and proceeds to change from state to state in response to the branch metrics, identifying the binary value for one or more digital input signals using information about previous and subsequent digital input values from the path metrics. As a result, the detector is better able to reconstruct data from digital input values.

SUMMARY OF THE INVENTION

An 8-state EPR4 maximum-likelihood detector has been commonly used to detect data in current tape drives. However, a disadvantage of such a detector is that the target channel is fixed to a single, predetermined EPR4 target and thus the detector target cannot be changed dynamically or adapt to the signals that are being read from tape.

The present invention reduces the number of errors in data that is read from magnetic tape while avoiding the disadvantage of a fixed 8-state maximum-likelihood detector. A 16-State adaptive NPML ("Noise Predictive Maximum-Likelihood") detector of the present invention addresses weaknesses of a conventional fixed, 8-state EPR4 detector. Rather than having a fixed target channel like a current maximum-likelihood detector, the detector of the present invention is programmable to allow a range of target channels. The detector can support "classical" partial response channels such as PR4 or EPR4 and can also support a range of target channels by programming two predictor or whitening filter coefficients. In one embodiment two predictor or whitening filter coefficients may be set via XREG inputs or dynamically determined through the use of an LMS ("Least Means Square") algorithm. The use of an LMS algorithm allows the detector to adapt the predictor coefficients as data from the tape is being read. Another embodiment provides a 16-State adaptive NPML for an EPR4 target channel in which the whitening filter has one coefficient.

Components of the detection system include the detector itself, an LMS engine, a coefficient engine and a noise predictive or whitening filter. Coefficients from the LMS engine may be loaded or stored dynamically based upon conditions in the tape drive.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and may exist, at least partially, merely as electronic signals on a system or network.

Furthermore, the described features, structures, or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Read/Write Channel Circuit—Overview

Figure 1:
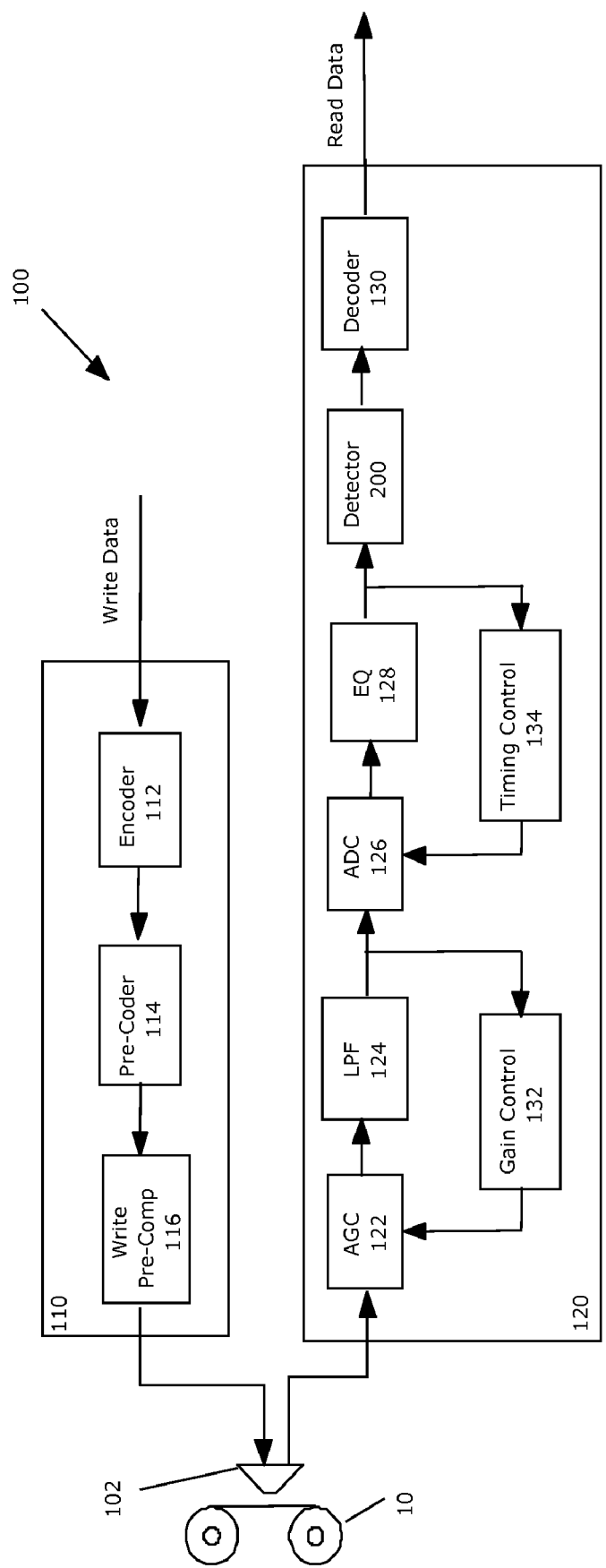
FIG. 1 is a block diagram of a read/write channel in which the present invention may be incorporated.

FIG. 1 is a block diagram of a read/write channel circuit 100 for a data storage device such as a tape drive, for example, in which the present invention may be incorporated. The read/write channel circuit 100 includes a read/write head 102, a write channel circuit 110 for writing data onto a recording medium 10 and a read channel circuit 120 for reading data from the recording medium. The write channel circuit 110 includes an encoder 112, a precoder 114 and a write pre-compensator 116. The read channel circuit 120 includes an automatic gain control (AGC) 122, a low pass filter (LPF) 124, an analog-to-digital converter (ADC) 126, an adaptive equalizer 128, a detector 200, a decoder 130, a gain controller 132 and a timing controller 134.

In operation, the encoder 112 encodes write data, received from a host (not shown) to be written onto recording medium 10, into a predetermined code. For example, an RLL (Run Length Limited) code, in which the number of adjacent zeros must remain between specified maximum and minimum values, is commonly used for this predetermined code. However, the present invention is not meant to be limited to RLL and other coding may be used. The pre-coder 114 is included to prevent error propagation and the write pre-compensator 116 reduces non-linear influences arising from the read/write head 102. However, because the response of the actual recording channel does not exactly coincide with the resulting transfer function, some subsequent equalization may be required.

The AGC amplifier 122 amplifies an analog signal read by the read/write head 102 from the recording medium 10. The low pass filter 124 removes high frequency noise from and reshapes the signal output from AGC amplifier 122. The signal output from the low pass filter 124 is converted into a discrete digital signal by the ADC 126. The resulting digital signal is then applied to the adaptive equalizer 128, which adaptively controls inter-symbol interference (ISI) to generate desired waveforms. The detector 200 receives the equalized signal output from the adaptive equalizer 128 and generates encoded data. The decoder 130 decodes the encoded data output from detector 128 to generate the final read data to be transmitted to the host. Additionally, in order to correct the analog signal envelope and the digitization sample timing, the gain controller 132 controls the gain of the AGC 122 and the timing controller 134 controls sample timing for the ADC 126. It will be appreciated that the foregoing description of the operation of the read/write channel circuit 100 is only a brief summary of the operation.

16-State Adaptive NPML Detector—Overview

Figure 2:
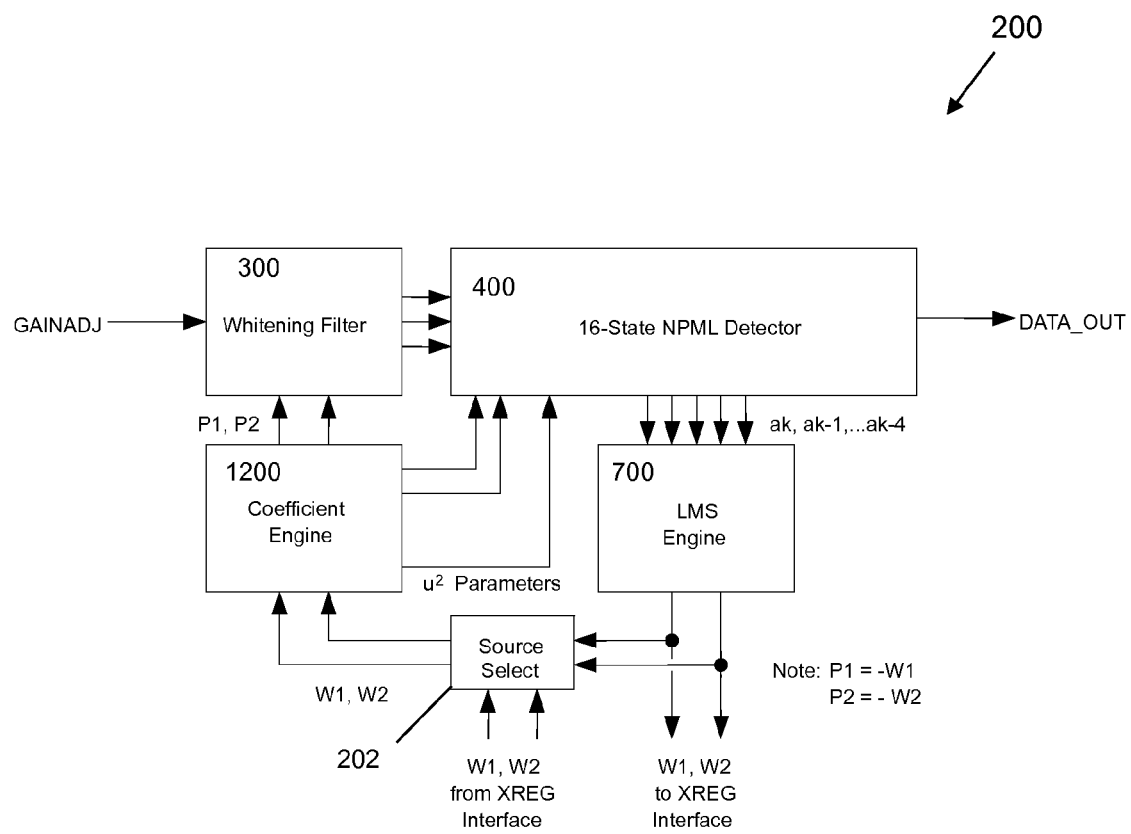
FIG. 2 is a block diagram of a detection system of the present invention.

A first embodiment of the 16-State adaptive NPML will now be described. A detector module 200 according to the first embodiment is illustrated in FIG. 2 and includes four blocks: a two-tap whitening filter 300; a 16-State NPML detector 400; a two-tap LMS engine 700; and a coefficient engine 1200 to determine the mean and mean-squared terms.

The primary input to the system, GAINADJ, is a sequence of synchronized and gain-adjusted digitized samples from the equalizer 128. The output of the system, DATA_OUT, is the binary data associated with the output of the encoder 112. Two parameters, W1 and W2, are used to define the detection target and to determine the waveform shape at the output of the whitening filter 300. W1 and W2 may be determined dynamically using an LMS algorithm or the may be set statically through a register (XREG) interface. Each of the four blocks will be described in detail.

Whitening Filter—Overview

Figure 3:
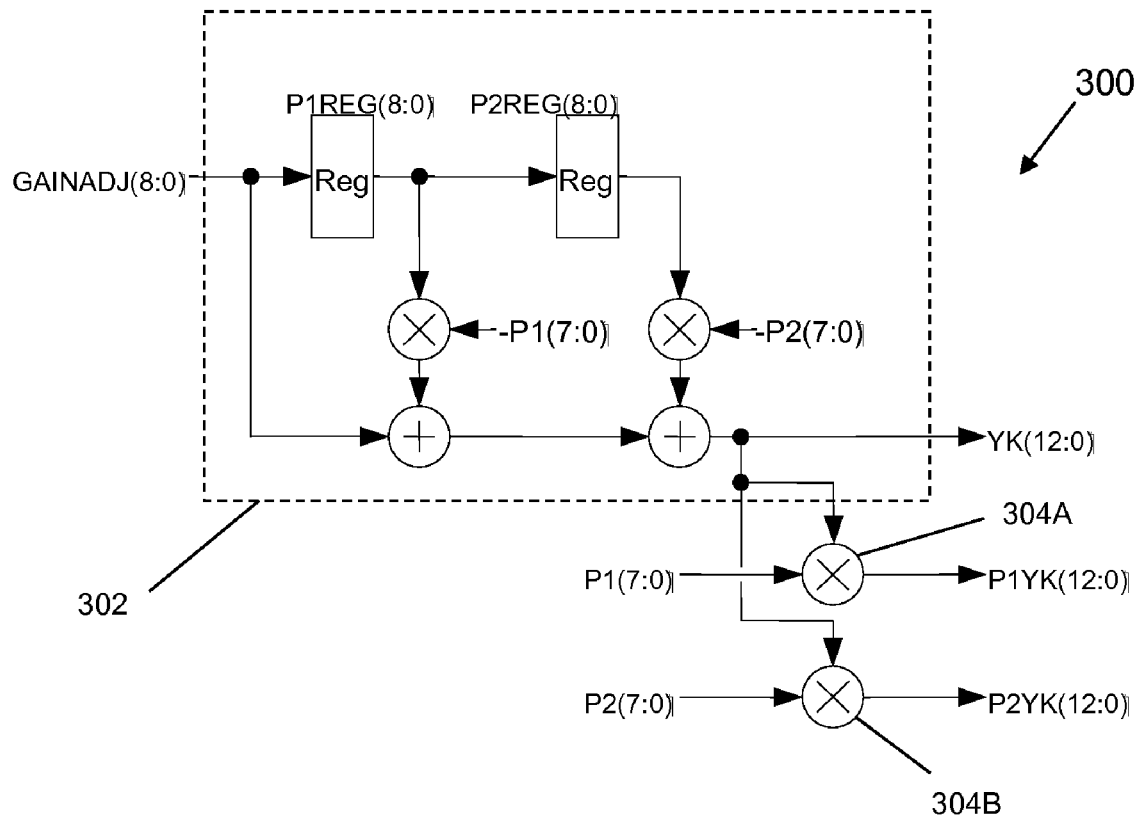
FIG. 3 is a logic diagram of an embodiment of the whitening filter of the detection system of FIG. 2.
Figure 4A:
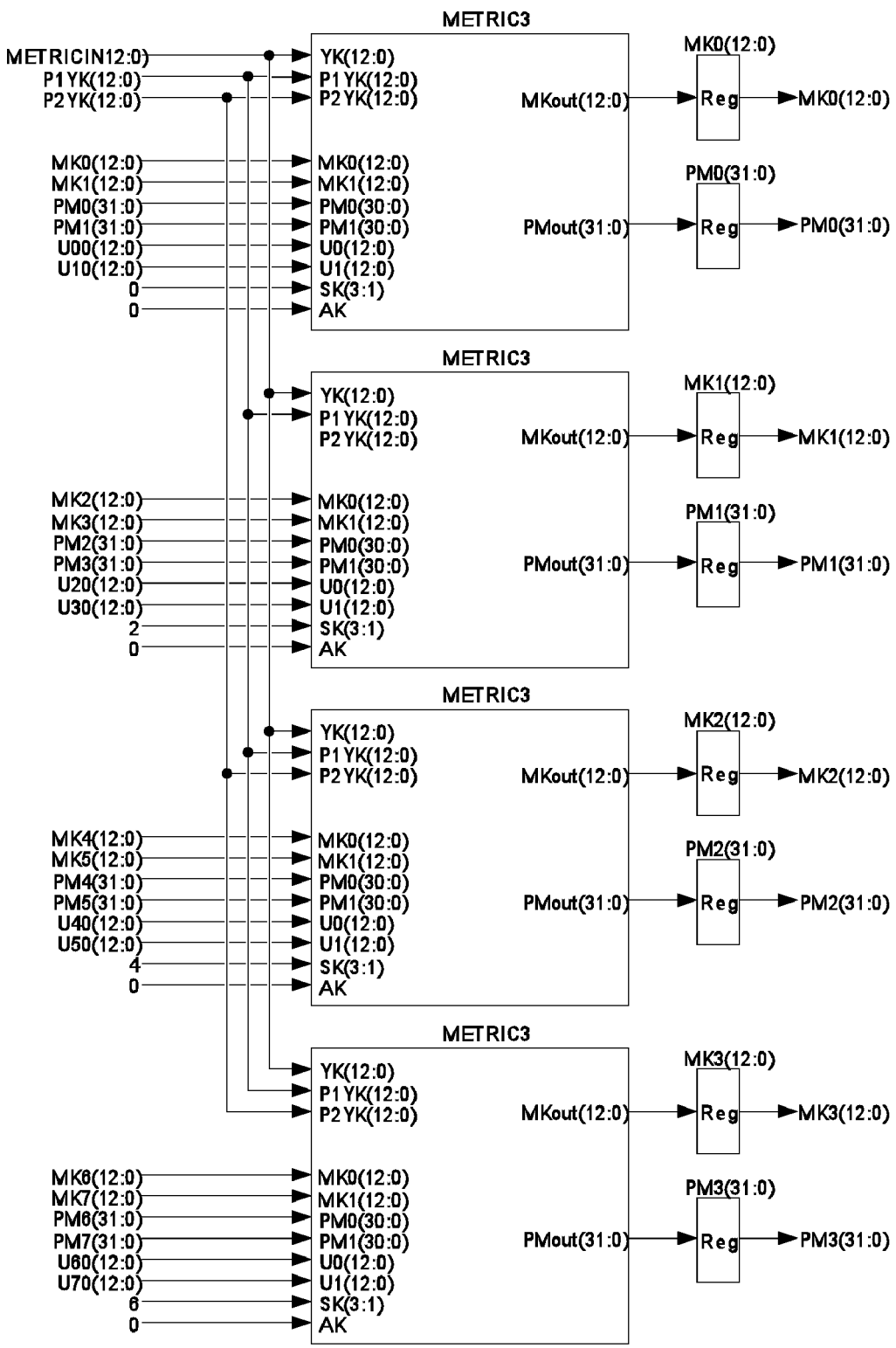
FIGS. 4A-4D illustrate the trellis and path metric structures of the 16-state NPML detector of FIG. 2.
Figure 4B:
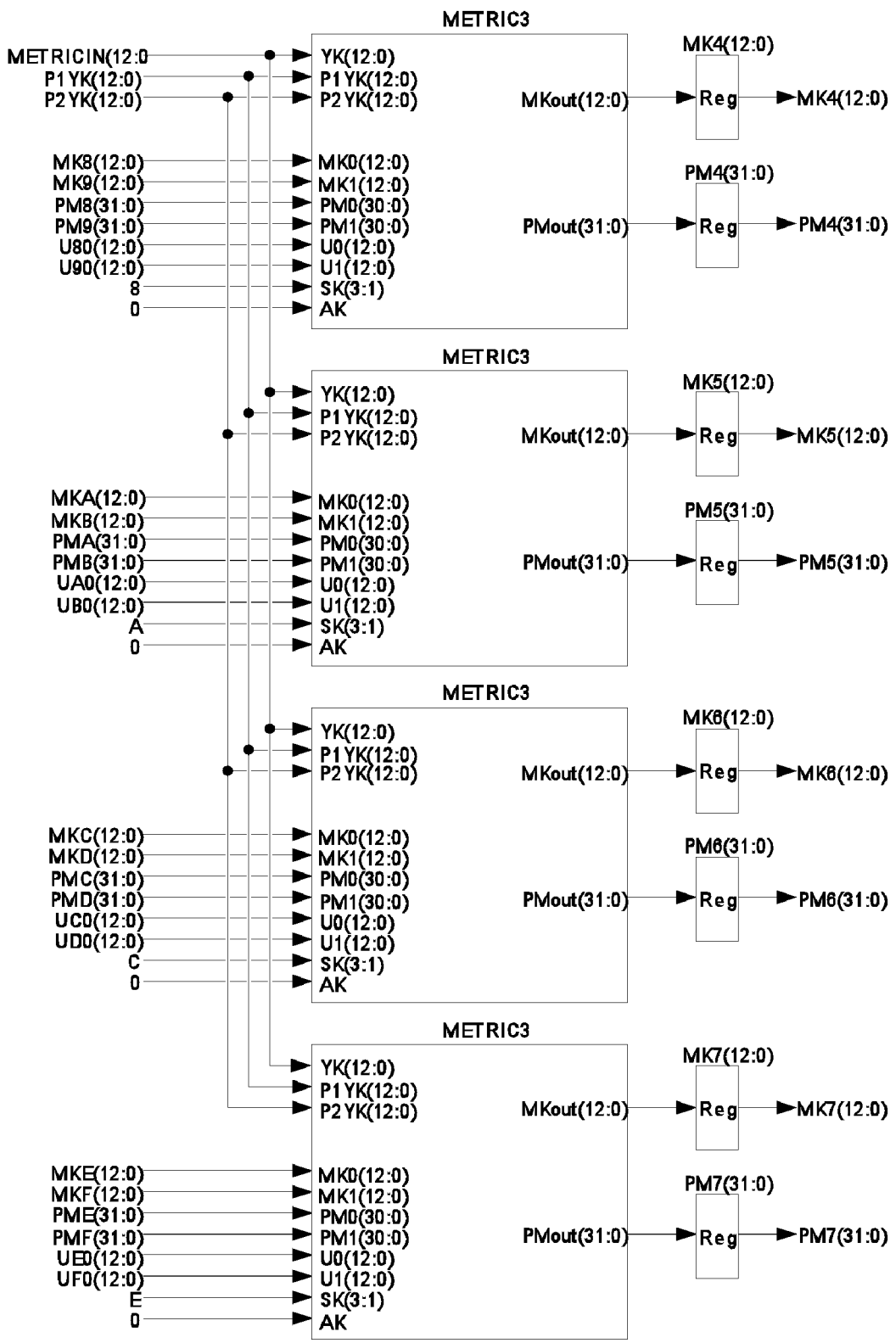
Figure 4C:
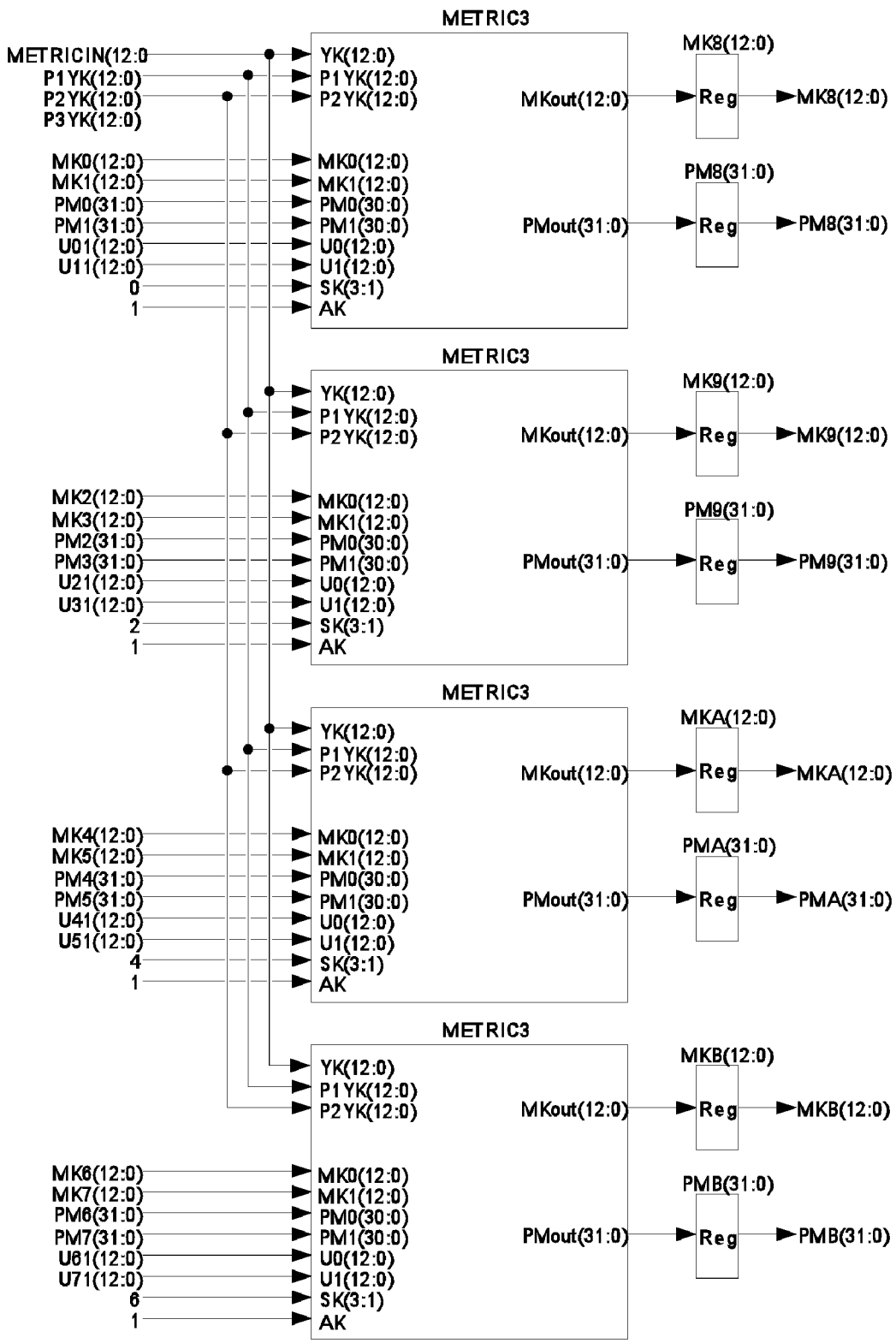
Figure 4D:
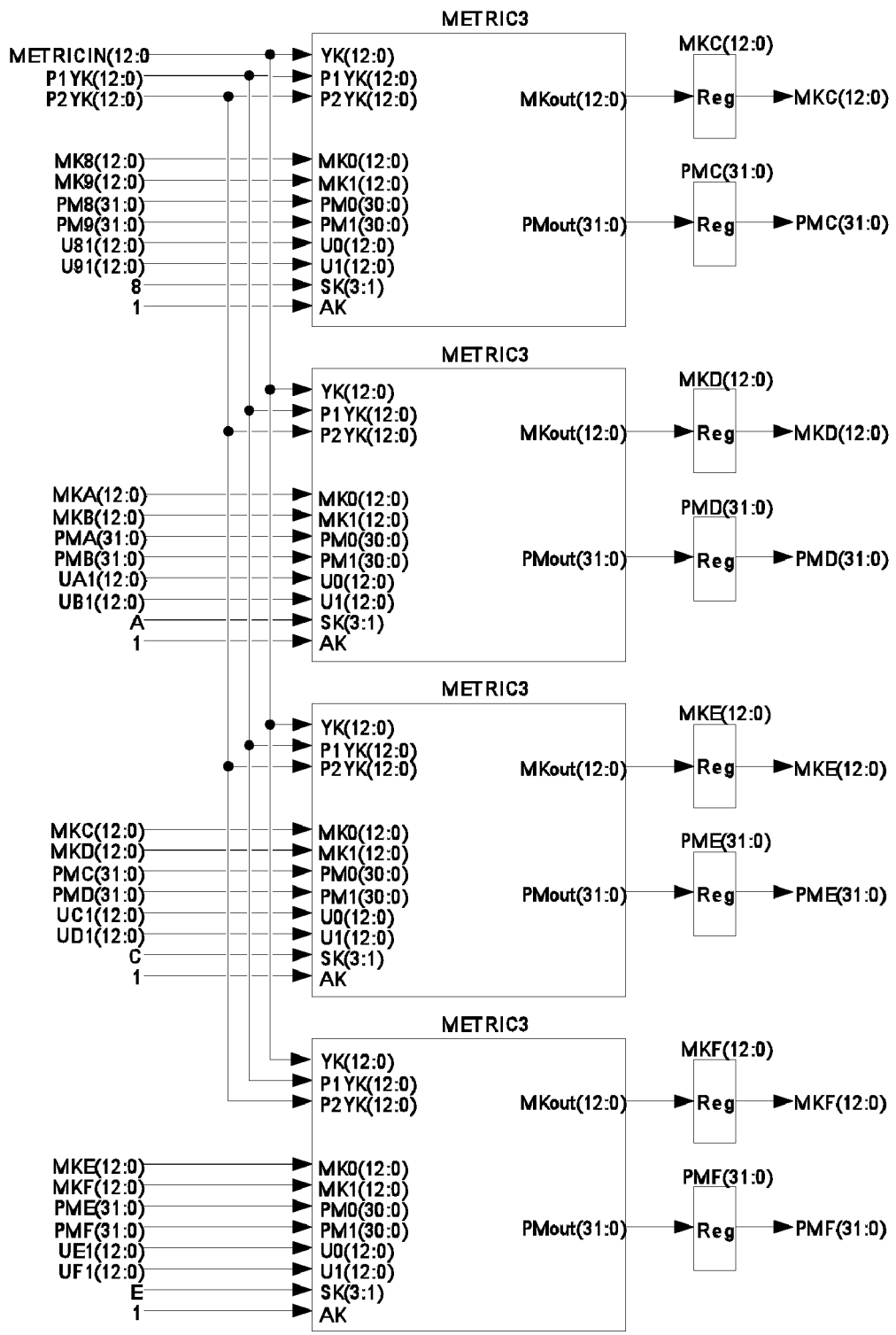

A block diagram of the whitening filter 300 is illustrated in FIG. 3. The input to the whitening filter 300 is a nine bit word, GAINADJ(8:0). GAINADJ(8:0) represents a sequence of digitized samples from the output of the equalizer 128 that has been equalized to a PR4 target, "synchronized" with bit locations and gain adjusted. The whitening filter 300 is preferably a FIR filter 302 with two programmable 8-bit taps, P1 and P2, ranging from +0.996 to −0.996. The initial output of the FIR filter, $y_k(12:0)$, originated as a full 19-bit number which is truncated to nine-bits and then sign extended to 13 bits.

Two pre-calculations for the NPML detector 400 are also performed by the whitening filter 300: $P1 \cdot y_k$ 304A and $P2 \cdot y_k$ 304B. Similar to the FIR filter 302, the multipliers P1 and P2 are eight-bit words and the multiplicand $y_k$ is a nine-bit word. Each product generated $P1y_k(12:0)$ and $P2y_k(12:0)$ is a 19-bit number that is first truncated to nine-bits and then sign extended to 13-bits. Truncation is preferably performed with rounding.

Maximum-Likelihood Detector—Log Likelihood Functions

The following mathematical equations describe a $4^{th}$ order maximum-likelihood detector 400 that may be used in the detector module 200 of the present invention.

$$m_k(0)=\text{maximum}\{m_{k-1}(0)+\ln[p(y_k|s_k=0;a_k=0)];m_{k-1}(1)+\ln[p(y_k|s_k=1;a_k=0)]\}$$

$$m_k(1)=\text{maximum}\{m_{k-1}(2)+\ln[p(y_k|s_k=2;a_k=0)];m_{k-1}(3)+\ln[p(y_k|s_k=3;a_k=0)]\}$$

$$m_k(2)=\text{maximum}\{m_{k-1}(4)+\ln[p(y_k|s_k=4;a_k=0)];m_{k-1}(5)+\ln[p(y_k|s_k=5;a_k=0)]\}$$

$$m_k(3)=\text{maximum}\{m_{k-1}(6)+\ln[p(y_k|s_k=6;a_k=0)];m_{k-1}(7)+\ln[p(y_k|s_k=7;a_k=0)]\}$$

$$m_k(4)=\text{maximum}\{m_{k-1}(8)+\ln[p(y_k|s_k=8;a_k=0)];m_{k-1}(9)+\ln[p(y_k|s_k=9;a_k=0)]\}$$

$$m_k(5)=\text{maximum}\{m_{k-1}(10)+\ln[p(y_k|s_k=10;a_k=0)];m_{k-1}(11)+\ln[p(y_k|s_k=11;a_k=0)]\}$$

$$m_k(6)=\text{maximum}\{m_{k-1}(12)+\ln[p(y_k|s_k=12;a_k=0)];m_{k-1}(13)+\ln[p(y_k|s_k=13;a_k=0)]\}$$

$$m_k(7)=\text{maximum}\{m_{k-1}(14)+\ln[p(y_k|s_k=14;a_k=0)];m_{k-1}(15)+\ln[p(y_k|s_k=15;a_k=0)]\}$$

$$m_k(8)=\text{maximum}\{m_{k-1}(0)+\ln[p(y_k|s_k=0;a_k=1)];m_{k-1}(1)+\ln[p(y_k|s_k=1;a_k=1)]\}$$

$$m_k(9)=\text{maximum}\{m_{k-1}(2)+\ln[p(y_k|s_k=2;a_k=1)];m_{k-1}(3)+\ln[p(y_k|s_k=3;a_k=1)]\}$$

$$m_k(10)=\text{maximum}\{m_{k-1}(4)+\ln[p(y_k|s_k=4;a_k=1)];m_{k-1}(5)+\ln[p(y_k|s_k=5;a_k=1)]\}$$

$$m_k(11)=\text{maximum}\{m_{k-1}(6)+\ln[p(y_k|s_k=6;a_k=1)];m_{k-1}(7)+\ln[p(y_k|s_k=7;a_k=1)]\}$$

$$m_k(12)=\text{maximum}\{m_{k-1}(8)+\ln[p(y_k|s_k=8;a_k=1)];m_{k-1}(9)+\ln[p(y_k|s_k=9;a_k=1)]\}$$

$$m_k(13)=\text{maximum}\{m_{k-1}(10)+\ln[p(y_k|s_k=10;a_k=1)];m_{k-1}(11)+\ln[p(y_k|s_k=11;a_k=1)]\}$$

$$m_k(14)=\text{maximum}\{m_{k-1}(12)+\ln[p(y_k|s_k=12;a_k=1)];m_{k-1}(13)+\ln[p(y_k|s_k=13;a_k=1)]\}$$

$$m_k(15)=\text{maximum}\{m_{k-1}(14)+\ln[p(y_k|s_k=14;a_k=1)];m_{k-1}(15)+\ln[p(y_k|s_k=15;a_k=1)]\}$$

Maximum-Likelihood Detector—Metric Calculations

The metric calculations shown below for the 16-state detector 400 are implemented in hardware and a similar methodology is described in more detail in the aforementioned U.S. Publication No. 2006/0176982. Upon first inspection, the logic associated with the metric calculations is very large. There are 32 multiplication operations associated with the mean parameters ($\mu_{0/0}$ through $\mu_{15/1}$) and 32 multiplication operations with the mean-squared parameters ($\mu_{0/0}^2$ through $\mu_{15/1}^2$). However, the number of multiplication operations may be reduced from 64 to three: two associated with the mean parameters and one associated with the mean-squared parameters.

$$m_k(0)=\text{maximum}\{m_{k-1}(0)+2\mu_{0/0}y_k-\mu_{0/0}^2;m_{k-1}(1)+2\mu_{1/0}y_k-\mu_{1/0}^2\} \quad \text{Eq. 1}$$

$$m_k(1)=\text{maximum}\{m_{k-1}(2)+2\mu_{2/0}y_k-\mu_{2/0}^2;m_{k-1}(3)+2\mu_{3/0}y_k-\mu_{3/0}^2\} \quad \text{Eq. 2}$$

$$m_k(2)=\text{maximum}\{m_{k-1}(4)+2\mu_{4/0}y_k-\mu_{4/0}^2;m_{k-1}(5)+2\mu_{5/0}y_k-\mu_{5/0}^2\} \quad \text{Eq. 3}$$

$$m_k(3)=\text{maximum}\{m_{k-1}(6)+2\mu_{6/0}y_k-\mu_{6/0}^2;m_{k-1}(7)+2\mu_{7/0}y_k-\mu_{7/0}^2\} \quad \text{Eq. 4}$$

$$m_k(4)=\text{maximum}\{m_{k-1}(8)+2\mu_{8/0}y_k-\mu_{8/0}^2;m_{k-1}(9)+2\mu_{9/0}y_k-\mu_{9/0}^2\} \quad \text{Eq. 5}$$

$$m_k(5)=\text{maximum}\{m_{k-1}(10)+2\mu_{10/0}y_k-\mu_{10/0}^2;m_{k-1}(11)+2\mu_{11/0}y_k-\mu_{11/0}^2\} \quad \text{Eq. 6}$$

$$m_k(6)=\text{maximum}\{m_{k-1}(12)+2\mu_{12/0}y_k-\mu_{12/0}^2;m_{k-1}(13)+2\mu_{13/0}y_k-\mu_{13/0}^2\} \quad \text{Eq. 7}$$

$$m_k(7)=\text{maximum}\{m_{k-1}(14)+2\mu_{14/0}y_k-\mu_{14/0}^2;m_{k-1}(15)+2\mu_{15/0}y_k-\mu_{15/0}^2\} \quad \text{Eq. 8}$$

$$m_k(8)=\text{maximum}\{m_{k-1}(0)+2\mu_{0/1}y_k-\mu_{0/1}^2;m_{k-1}(1)+2\mu_{1/1}y_k-\mu_{1/1}^2\} \quad \text{Eq. 9}$$

$$m_k(9)=\text{maximum}\{m_{k-1}(2)+2\mu_{2/1}y_k-\mu_{2/1}^2;m_{k-1}(3)+2\mu_{3/1}y_k-\mu_{3/1}^2\} \quad \text{Eq. 10}$$

$$m_k(10)=\text{maximum}\{m_{k-1}(4)+2\mu_{4/1}y_k-\mu_{4/1}^2;m_{k-1}(5)+2\mu_{5/1}y_k-\mu_{5/1}^2\} \quad \text{Eq. 11}$$

$$m_k(11)=\text{maximum}\{m_{k-1}(6)+2\mu_{6/1}y_k-\mu_{6/1}^2;m_{k-1}(7)+2\mu_{7/1}y_k-\mu_{7/1}^2\} \quad \text{Eq. 12}$$

$$m_k(12)=\text{maximum}\{m_{k-1}(8)+2\mu_{8/1}y_k-\mu_{8/1}^2;m_{k-1}(9)+2\mu_{9/1}y_k-\mu_{9/1}^2\} \quad \text{Eq. 13}$$

$$m_k(13)=\text{maximum}\{m_{k-1}(10)+2\mu_{10/1}y_k-\mu_{10/1}^2;m_{k-1}(11)+2\mu_{11/1}y_k-\mu_{11/1}^2\} \quad \text{Eq. 14}$$

$$m_k(14)=\text{maximum}\{m_{k-1}(12)+2\mu_{12/1}y_k-\mu_{12/1}^2;m_{k-1}(13)+2\mu_{13/1}y_k-\mu_{13/1}^2\} \quad \text{Eq. 15}$$

$$m_k(15)=\text{maximum}\{m_{k-1}(14)+2\mu_{14/1}y_k-\mu_{14/1}^2;m_{k-1}(15)+2\mu_{15/1}y_k-\mu_{15/1}^2\} \quad \text{Eq. 16}$$

Maximum-Likelihood Detector—$(1-D^2)(1-P_1D-P_2D^2)$

When the input to the detector (GAINADJ(8:0) at the input to the whitening filter 300) has a PR4 target, then the overall target channel for the $4^{th}$ order NPML detector 400 is:

$$(1-D^2)(1-P_1D-P_2D^2)=h_0+h_1D+h_2D^2+h_3D^3+h_4D^4$$

where:

$h_0=1$
$h_1=-P_1$
$h_2=-(1+P_2)$
$h_3=P_1$
$h_4=P_2$

The 32 mean parameters are based upon all possible combinations of the five h-coefficients. As can be seen in TABLE I below, each of the mean parameters may be derived from the sum/difference of only three terms: 1, P1, and P2. Similarly, each of the mean-product calculations ($\mu_{0/0}y_k, \mu_{0/1}y_k \ldots \mu_{15/1}y_k$) may be determined by adding/subtracting three terms: $y_k$, $P1 \cdot y_k$ and $P2 \cdot y_k$. This greatly simplifies the number of multiplications associated with the NPML detector. As noted earlier in the section on the whitening filter 300, in a hardware implementation the mean-product terms are nine-bits in size and sign extended to 13 bits.

TABLE I

| | |
|---|---|
| $\mu_{0/0} = 0$ | $\mu_{0/1} = h_0 = 1$ |
| $\mu_{1/0} = h_4 = P_2$ | $\mu_{1/1} = h_0 + h_4 = 1 + P_2$ |
| $\mu_{2/0} = h_3 = P_1$ | $\mu_{2/1} = h_0 + h_3 = 1 + P_1$ |
| $\mu_{3/0} = h_3 + h_4 = P_1 + P_2$ | $\mu_{3/1} = h_0 + h_3 + h_4 = 1 + P_1 + P_2$ |
| $\mu_{4/0} = h_2 = -(1 + P_2)$ | $\mu_{4/1} = h_0 + h_2 = -P_2$ |
| $\mu_{5/0} = h_2 + h_4 = -1$ | $\mu_{5/1} = h_0 + h_2 + h_4 = 0$ |
| $\mu_{6/0} = h_2 + h_3 = P_1 - (1 + P_2)$ | $\mu_{6/1} = h_0 + h_2 + h_3 = P_1 - P_2$ |
| $\mu_{7/0} = h_2 + h_3 + h_4 = P_1 - 1$ | $\mu_{7/1} = h_0 + h_2 + h_3 + h_4 = P_1$ |
| $\mu_{8/0} = h_1 = -P_1$ | $\mu_{8/1} = h_0 + h_1 = 1 - P_1$ |
| $\mu_{9/0} = h_1 + h_4 = P_2 - P_1$ | $\mu_{9/1} = h_0 + h_1 + h_4 = 1 + P_2 - P_1$ |
| $\mu_{10/0} = h_1 + h_3 = 0$ | $\mu_{10/1} = h_0 + h_1 + h_3 = 1$ |
| $\mu_{11/0} = h_1 + h_3 + h_4 = P_2$ | $\mu_{11/1} = h_0 + h_1 + h_3 + h_4 = 1 + P_2$ |
| $\mu_{12/0} = h_1 + h_2 = -(P_1 + P_2 + 1)$ | $\mu_{12/1} = h_0 + h_1 + h_2 = -(P_1 + P_2)$ |
| $\mu_{13/0} = h_1 + h_2 + h_4 = -(P_1 + 1)$ | $\mu_{13/1} = h_0 + h_1 + h_2 + h_4 = -P_1$ |
| $\mu_{14/0} = h_1 + h_2 + h_3 = -(P_2 + 1)$ | $\mu_{14/1} = h_0 + h_1 + h_2 + h_3 = -P_2$ |
| $\mu_{15/0} = h_1 + h_2 + h_3 + h_4 = -1$ | $\mu_{15/1} = h_0 + h_1 + h_2 + h_3 + h_4 = 0$ |

Maximum-Likelihood Detector—Trellis and Path Metric Structure

The VHDL for the metric calculations set forth in Equations 1-16 above may be designed into a structure that can be replicated sixteen times, illustrated in FIGS. 4A-4D. The inputs SK(3:1) and AK are used to select the mean-product terms for the given metric calculation. The inputs to the mean-squared terms U0(12:0) and U1(12:0) are generated by the coefficient engine 1200.

Maximum-Likelihood Detector—Metric 0 and 1 Structures

Figure 5A:
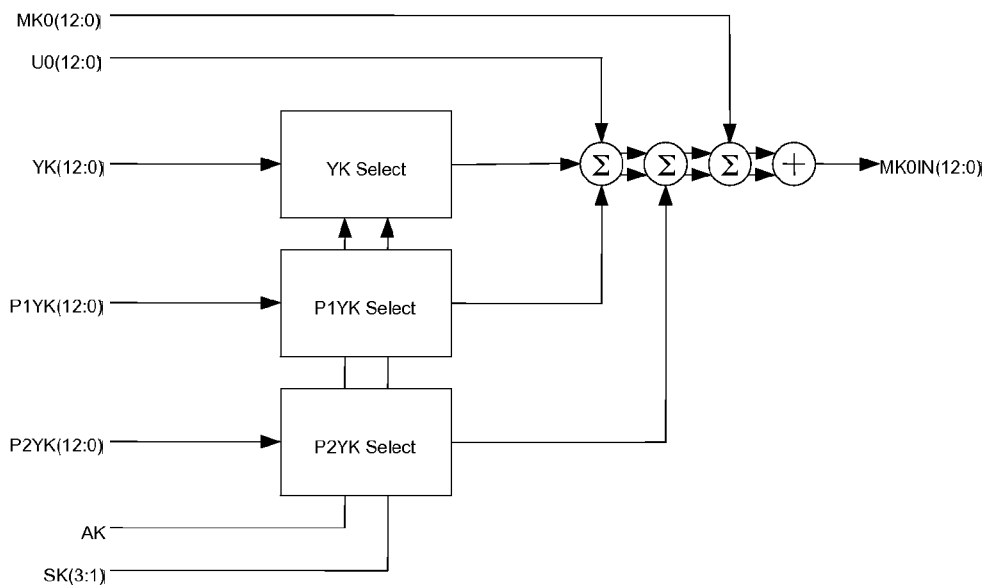
FIGS. 5A and 5B are logic diagrams of the metric 0 and metric 1 structures, respectively, of FIGS. 4A-4D.
Figure 5B:
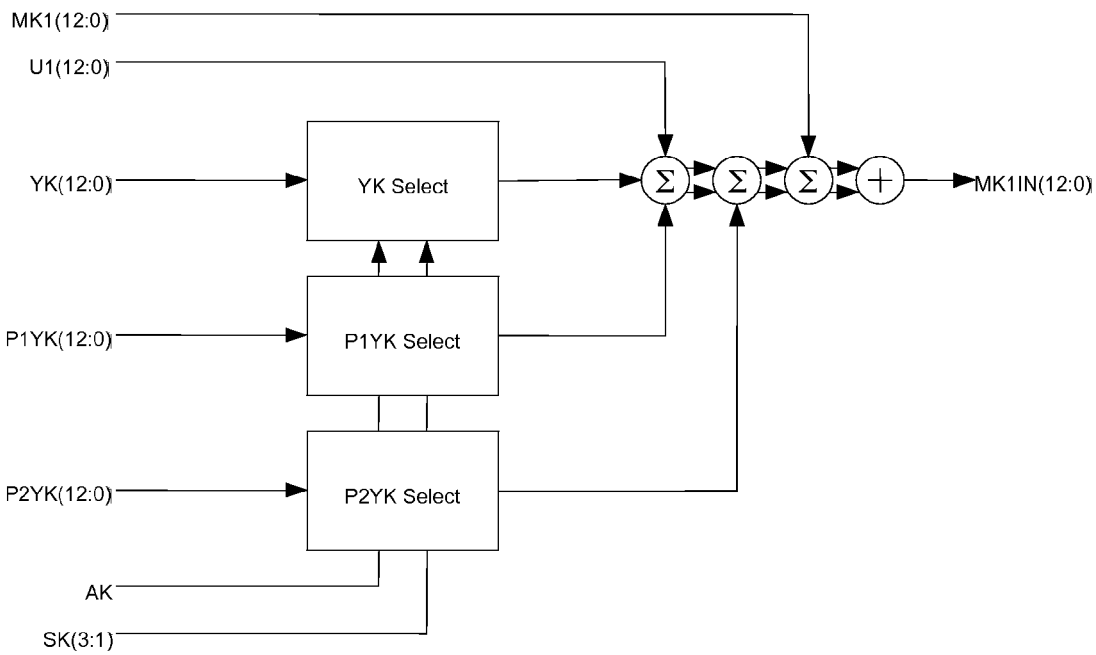

FIGS. 5A and 5B illustrate the structures of the detector 400 which perform the metric 0 and metric 1 portions, respectively, of Equations 1-16. TABLES II and III describe the inputs to the structure of FIGS. 5A and 5B, respectively.

TABLE II

METRIC 0 INPUTS

| Sk/Ak | SK(3:1) | AK | YK Select | P1YK Select | P2YK Select |
|---|---|---|---|---|---|
| 0/0 | 000 | 0 | 0 | 0 | 0 |
| 2/0 | 001 | 0 | 0 | P1yk | 0 |
| 4/0 | 010 | 0 | -yk | 0 | -P2yk |
| 6/0 | 110 | 0 | -yk | P1yk | -P2yk |
| 8/0 | 100 | 0 | 0 | -P1yk | 0 |
| 10/0 | 101 | 0 | 0 | 0 | 0 |
| 12/0 | 110 | 0 | -yk | -P1yk | -P2yk |
| 14/0 | 111 | 0 | -yk | 0 | -P2yk |
| 0/1 | 000 | 1 | +yk | 0 | 0 |
| 2/1 | 001 | 1 | +yk | P1yk | 0 |
| 4/1 | 010 | 1 | 0 | 0 | -P2yk |
| 6/1 | 110 | 1 | 0 | P1yk | -P2yk |
| 8/1 | 100 | 1 | 0 | -P1yk | 0 |
| 10/1 | 101 | 1 | +yk | 0 | 0 |
| 12/1 | 110 | 1 | +yk | -P1yk | -P2yk |
| 14/1 | 111 | 1 | 0 | 0 | -P2yk |

TABLE III

METRIC 1 INPUTS

| Sk/Ak | SK(3:1) | AK | YK Select | P1YK Select | P2YK Select |
|---|---|---|---|---|---|
| 1/0 | 000 | 0 | 0 | 0 | P2yk |
| 3/0 | 001 | 0 | 0 | P1yk | P2yk |
| 5/0 | 010 | 0 | -yk | 0 | 0 |
| 7/0 | 110 | 0 | -yk | P1yk | 0 |
| 9/0 | 100 | 0 | 0 | -P1yk | P2yk |
| 11/0 | 101 | 0 | 0 | 0 | P2yk |
| 13/0 | 110 | 0 | -yk | -P1yk | 0 |
| 15/0 | 111 | 0 | -yk | 0 | 0 |

TABLE III-continued

METRIC 1 INPUTS

| Sk/Ak | SK(3:1) | AK | YK Select | P1YK Select | P2YK Select |
|---|---|---|---|---|---|
| 1/1 | 000 | 1 | +yk | 0 | P2yk |
| 3/1 | 001 | 1 | +yk | P1yk | P2yk |
| 5/1 | 010 | 1 | 0 | 0 | 0 |
| 7/1 | 110 | 1 | 0 | P1yk | 0 |
| 9/1 | 100 | 1 | 0 | -P1yk | P2yk |
| 11/1 | 101 | 1 | +yk | 0 | P2yk |
| 13/1 | 110 | 1 | +yk | -P1yk | 0 |
| 15/1 | 111 | 1 | 0 | 0 | 0 |

The inputs SK(3:1) and AK are hard-coded in the VHDL for each metric block. It is assumed that the VHDL synthesizer will keep only the logic that is needed for that specific block. Thus, each YK, P1YK, and P2YK select block will be synthesized into fixed logic structures that do not change over time.

Maximum-Likelihood Detector—Compare and Select Logic

Figure 6:
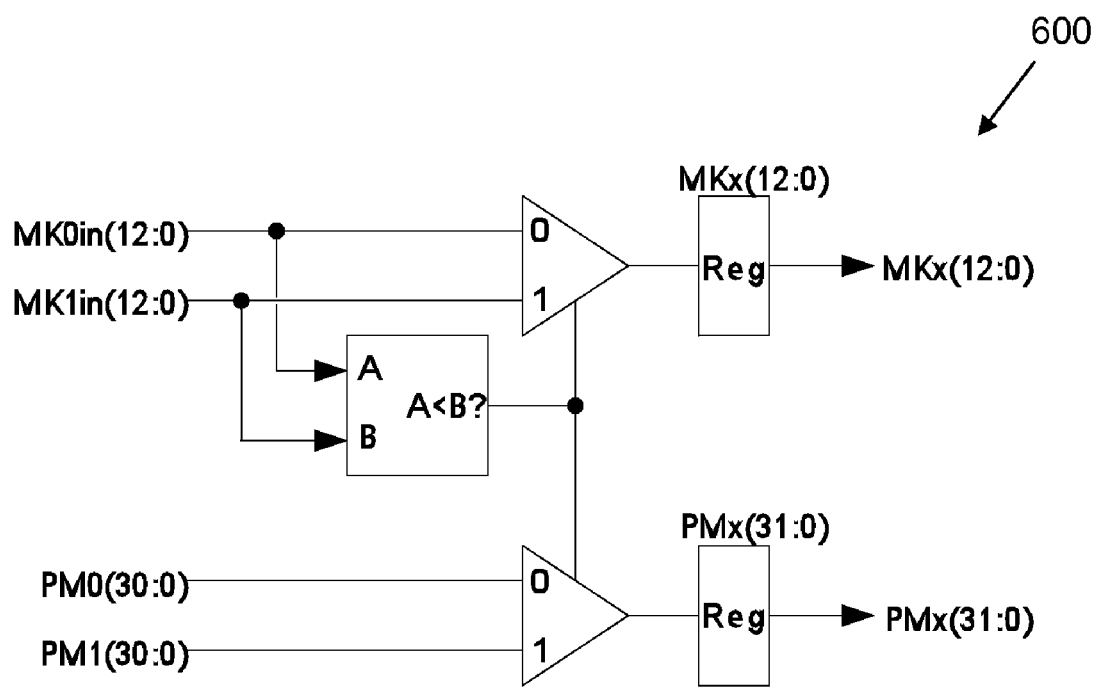
FIG. 6 is a diagram of compare and select logic of the metric 0 and metric 1 structures, respectively, of FIGS. 4A-4D.

FIG. 6 is a diagram of compare and select logic 600 of the NPML detector 400 which selects the larger of the metric 0 or metric 1 values, MK0IN(12:0) or MK1IN(12:0), generated by the metric 0 and metric 1 structures of FIGS. 5A and 5B pursuant to Equations 1-16. Because compare and select logic is well known in the art, details are not provided herein.

LMS Engine—Overview

Figure 7:
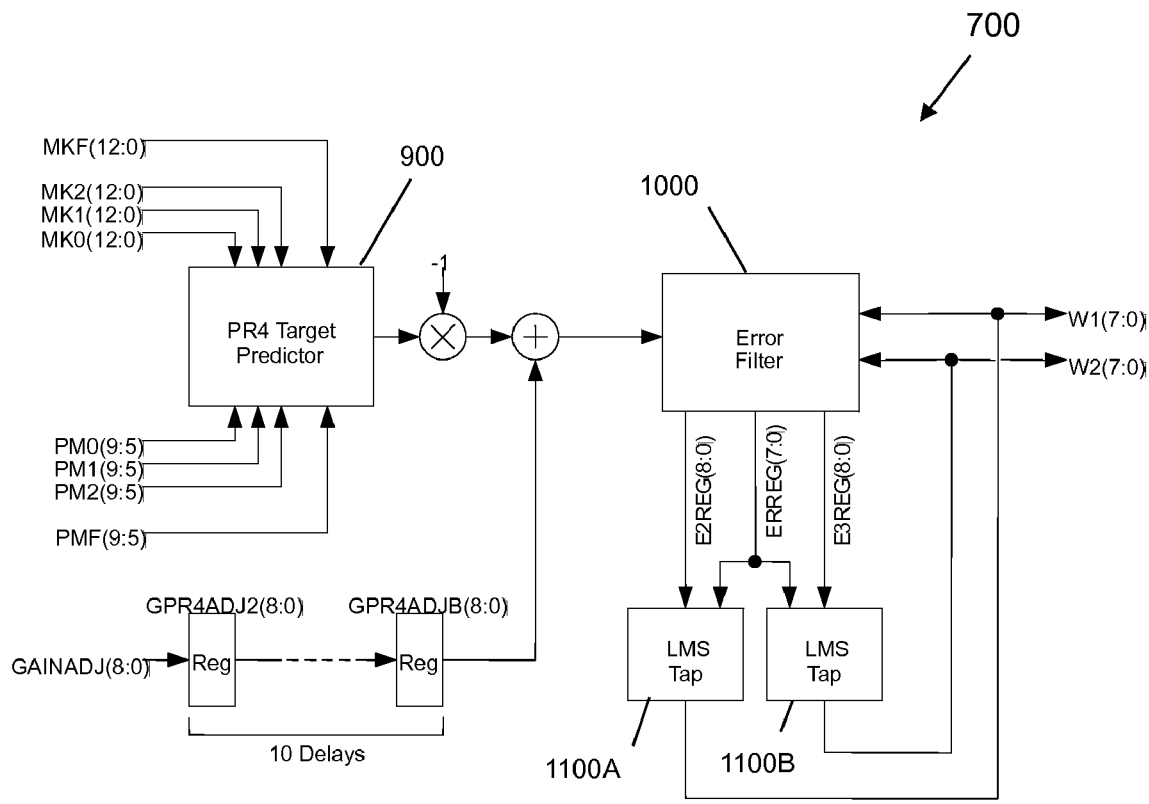
FIG. 7 illustrates a hardware architecture of the LMS engine of FIG. 2.

Because different drives and different media have different characteristics, the present invention allows the system 200 to adapt to the actual read-back signal in the channel 100. The LMS engine 700 determines the predictor coefficients used to for the adaptive process. The hardware architecture of the LMS engine 700 is illustrated in FIG. 7. The three main components to the hardware LMS engine 700 are a PR4 target and error generator 900, an error filter 1000 and two LMS taps 1100A, 1100B.

Figure 8:
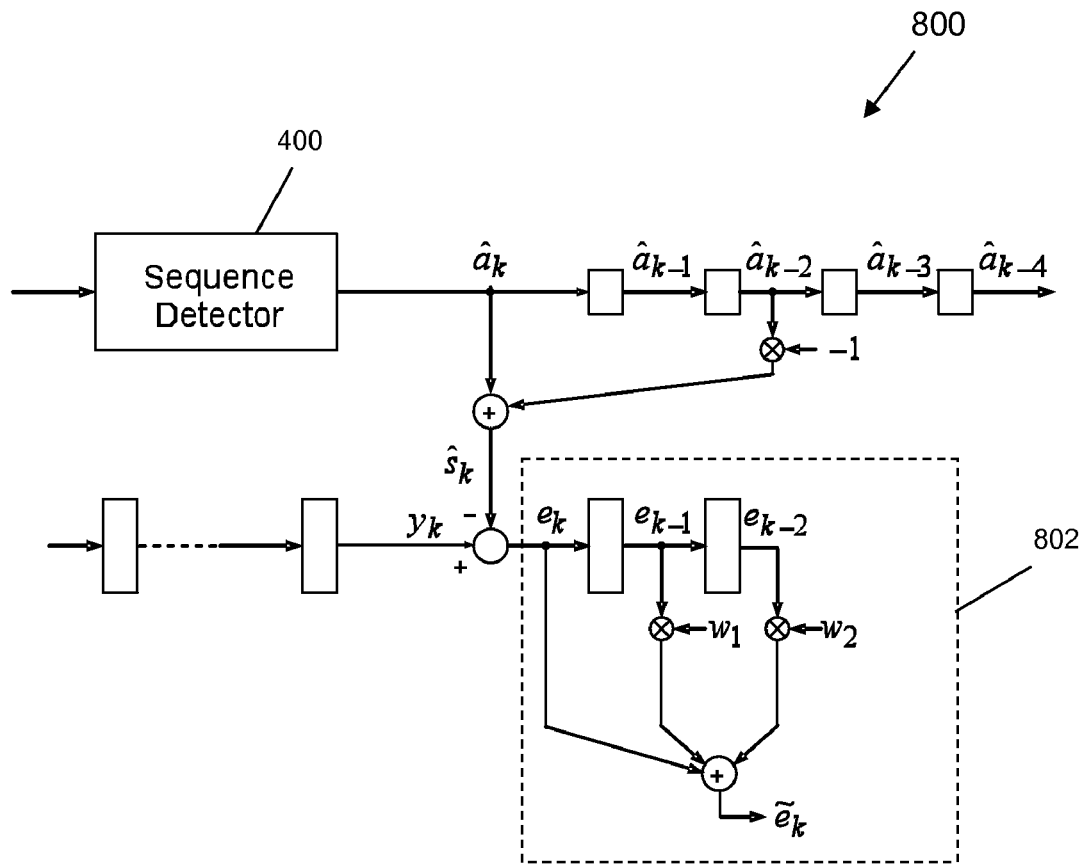
FIG. 8 is a logic diagram of the LMS engine of FIG. 7.

A generalized diagram of the target and error generator 900 and the error filter 1000 is shown in FIG. 8. The binary sequence $(\hat{a}_k, \hat{a}_{k-1}, \ldots \hat{a}_{k-4})$ is derived from the path memory 600. From the binary sequence, the expected PR4 samples are derived and compared to the received PR4 samples to derive an error signal $e_k$. The error signal is filtered through a FIR filter 802 that matches the whitening filter architecture and produces an output $\tilde{e}_k$. The filter output $\tilde{e}_k$ is input into two LMS taps (not shown in FIG. 8) to generate $w_1$ and $w_2$ which are fed back to the FIR filter. As noted in FIG. 8, the coefficients are updated as $w_1 \leftarrow w_1 - \alpha \tilde{e}_k e_{k-1}$ and $w_2 \leftarrow w_2 - \alpha \tilde{e}_k e_{k-2}$.

LMS Engine—PR4 Target and Error Generation

Figure 9:
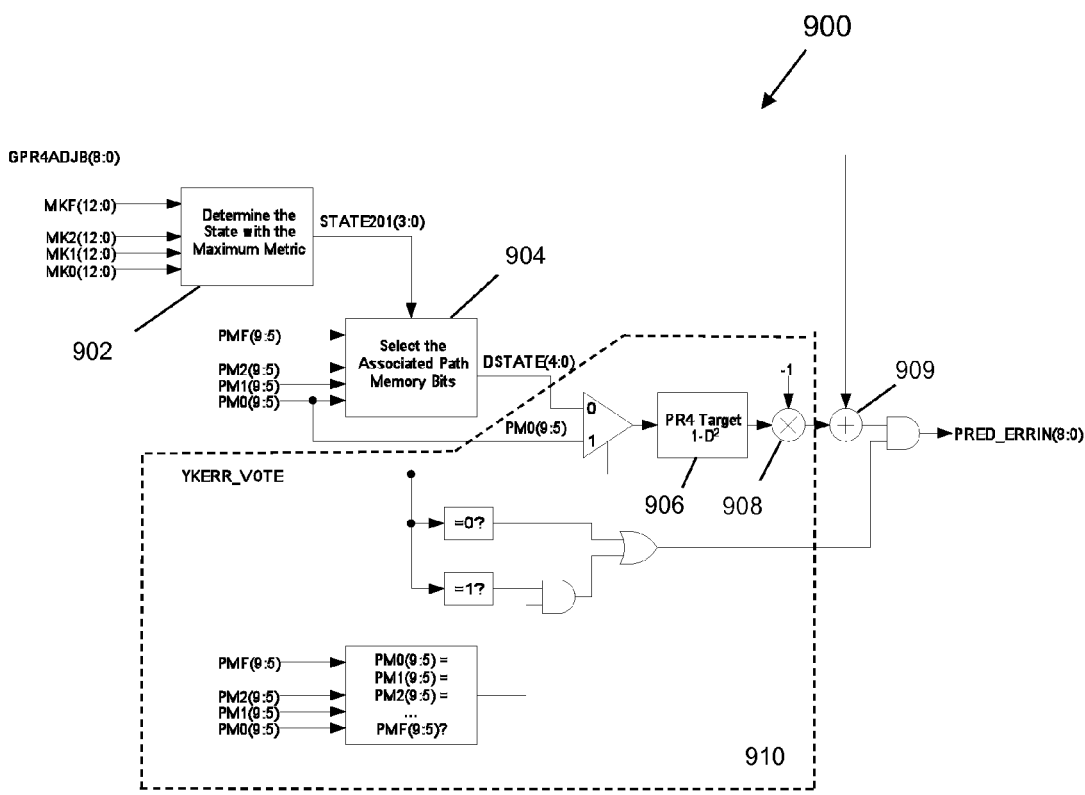
FIG. 9 illustrates a PR4 target and error generator of the LMS engine of FIG. 7.

The logic associated with target and error generator block 900 of the LMS engine 700 is shown in FIG. 9. This function determines the error between the expected PR4 signal and the received PR4 signal. The process begins with determining the state with the largest metric 902; that is, the state that most likely contains the correct binary sequence. This logic comprises a sequence of metric comparisons, comparing metrics two at a time and saving the largest metric and the associated state. Once the state that has the largest metric is identified, the path memory 600 is selected for that state 904. Each path memory is 32 bits in length with bits five through nine being used as estimates of $\hat{a}_k, \hat{a}_{k-1}, \ldots \hat{a}_{k-4}$. A qualifying circuit 910 (without blocks 906 and 908) may be included to help prevent false sequences from corrupting the error If enabled by setting YKERR_VOTE=1, then an error will be signal. generated only when all the $\hat{a}_k, \hat{a}_{k-1}, \ldots \hat{a}_{k-4}$ sequence from each of the path memories is identical; that is, where there is unanimous agreement between the path memories on what the received signal is. With the path memory bits, the ideal PR4 signal is reconstructed in the PR4 target module 906 and the difference between it and the received PR4 signal (GPR4 ADJB(8:0)) is calculated by multiplier and adder blocks 908, 909.

LMS Engine—Error Filter

Figure 10:
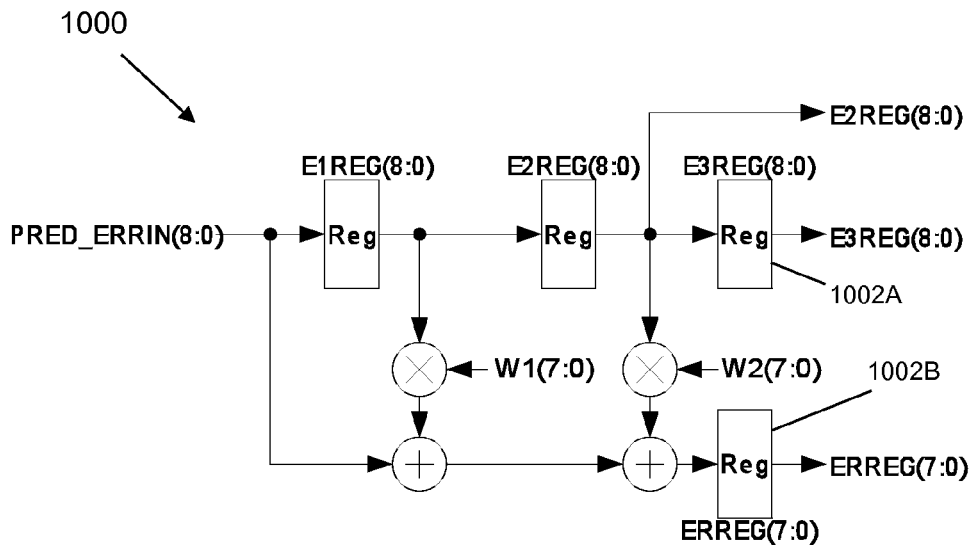
FIG. 10 illustrates an error filter of the LMS engine of FIG. 7.

The error filter 1000 is illustrated in FIG. 10 and is similar to the whitening filter 300 with the primary difference being an additional set of registers 1002A, 1002B at the output The registers 1002A, 1002B break the large combinatorial logic blocks into smaller blocks between registers to allow the logic to be run at a higher clock rate.

LMS Engine—LMS Taps

Figure 11:
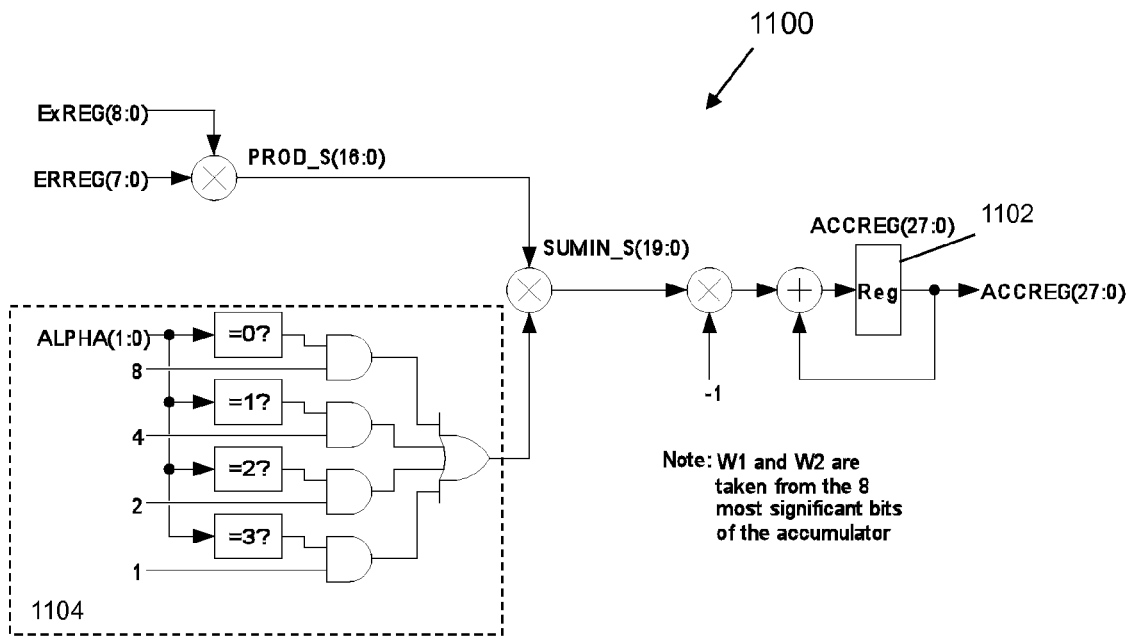
FIG. 11 illustrates the LMS tap logic of the LMS engine of FIG. 7.

Two LMS taps 1100A, 1100B (both referred to generally in FIG. 11 as 1100) are used to generate $w_1$ and $w_2$ from the eight most significant bits of the accumulator 1102. The LMS $\alpha$ gain can be selected from one of four binary shifts 1104. $w_1$ and $w_2$ are both eight bit words ranging from +0.996 to −0.996. A near-EPR4 target may be achieved by setting $w_1$=127 (0x7F) and $w_2$=0. Rather than the 1+D transfer function used for an EPR4 whitening filter, the transfer function is 1+0.996D. A PR4 target may be achieved by setting $w_1$=0 and $w_2$=0. The LMS gain values are selected from:

$$\alpha \in \{0.00001544, 0.00003088, 0.00006176, 0.00012352\}$$

Coefficient Engine

Figure 12:
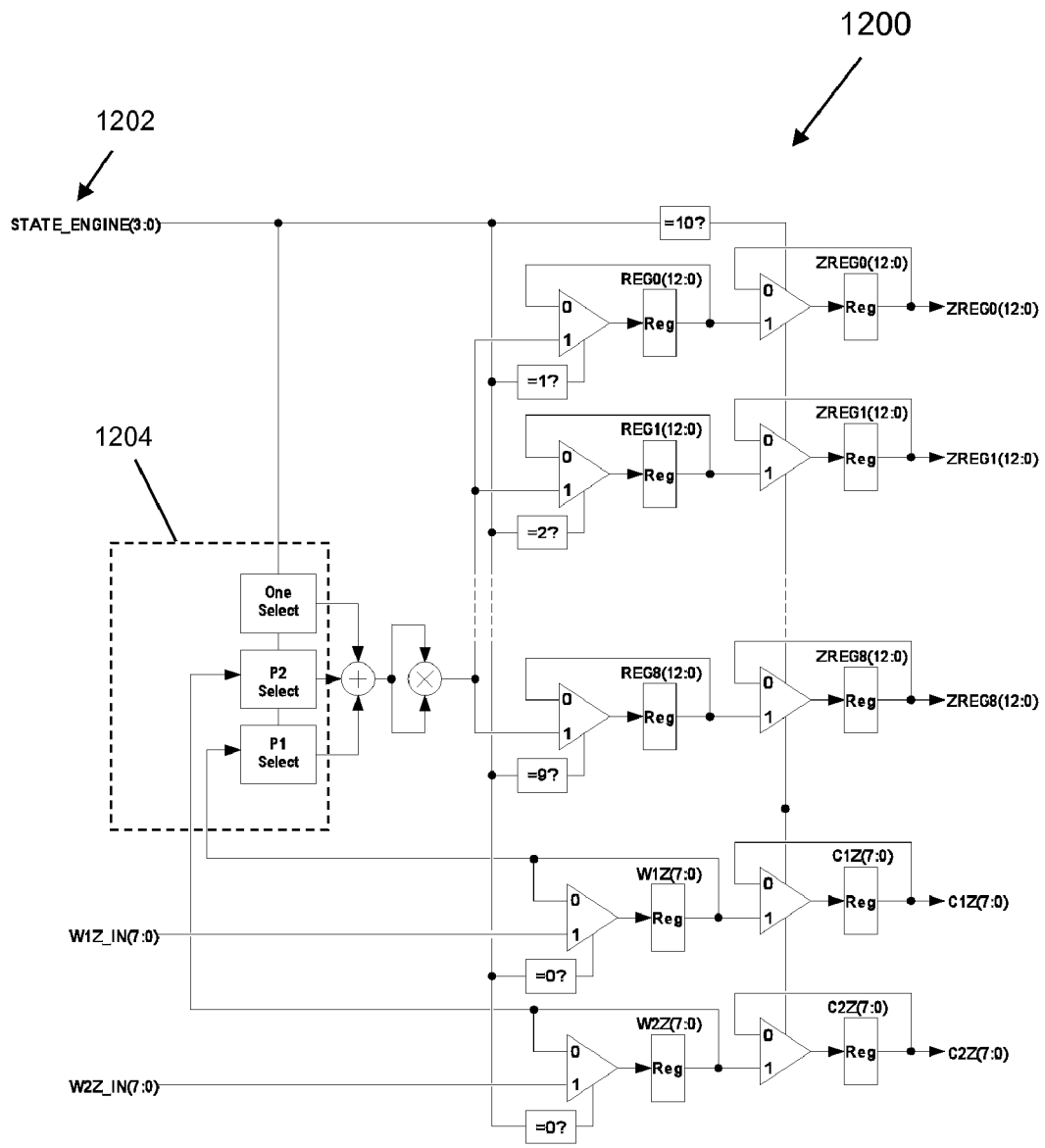
FIG. 12 is a block diagram of the coefficient engine of FIG. 2.

A source select module 202 (FIG. 2) managed by microcode in the tape drive microprocessor allows the coefficient inputs $w_1$ and $w_2$ for the coefficient engine 1200 to be dynamically determined by the LMS engine 700 or established by the microcode through register values. Two values are available in the event that the LMS engine adapts to the wrong value. There may also be a condition in which it is preferable to disable the adaptation function and operate with fixed values. The coefficient engine 1200 is illustrated in FIG. 12. In the section above describing the metric calculations, that there are 32 multiplication operations associated with the mean-squared parameters ($\mu_{0/0}^2$ through $\mu_{15/1}^2$) for a given set of predictor coefficients. When the whitening filter 300 of the present invention is used, the number of unique multiplications associated with the mean-squared parameters may be reduced to only nine:

1. $P_2^2$
2. $P_1^2$
3. $(P_1+P_2)^2$
4. $(P_2+1)^2$
5. $(P_1-P_2-1)^2$
6. $(P_1-1)^2$
7. $(P_2-P_1)^2$
8. $(P_1+P_2+1)^2$
9. $(P_1+1)^2$

The calculations may be performed in parallel. Alternatively, the number of multiplications performed at one time may be further reduced to one if the mean-squared terms are calculated sequentially. This employs a small state machine to select at most three inputs to an adder and squaring block. The results are saved as they are calculated (REG0-REG8) and then all of the mean-squared terms (ZREG0-ZREG8) plus C1Z and C2Z are sent to the detector 400 and whitening filter 300, preferably simultaneously.

TABLE IV presents the status of the outputs of the P1 Select, P2 Select and One Select for each of the nine possible states of the State_Engine.

TABLE IV

| STATE_ENGINE(3:0) | P1 Select | P2 Select | One Select |
|---|---|---|---|
| 1 | 0 | P2 | 0 |
| 2 | P1 | 0 | 0 |
| 3 | P1 | P2 | 0 |
| 4 | 0 | P2 | 1 |
| 5 | P1 | −P2 | −1 |
| 6 | P1 | 0 | −1 |
| 7 | −P1 | P2 | 0 |
| 8 | P1 | P2 | 1 |
| 9 | P1 | 0 | 1 |

Figure 13:
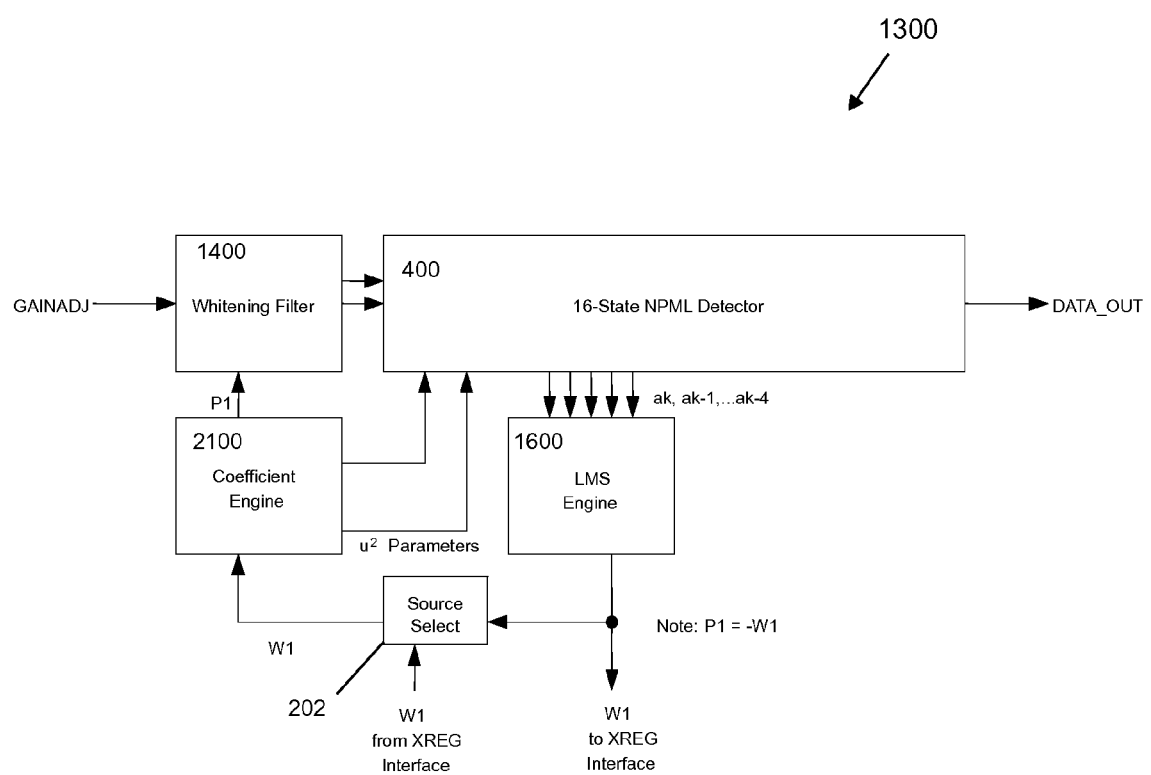
FIG. 13 is a block diagram of a second embodiment of a detection system of the present invention.

A second embodiment of the 16-State adaptive NPML, for an EPR4 target, will now be described. A detector module 1300 according to the second embodiment the present invention is illustrated in FIG. 13 and includes four blocks: a one-tap whitening filter 1400; a 16-State NPML detector 400; a one-tap LMS engine 1600; and a coefficient engine 2100 to determine the mean and mean-squared terms.

The primary input to the system, GAINADJ, is a sequence of synchronized and gain-adjusted digitized samples which have been equalized to an EPR4 target in the equalizer 128. The output of the system, DATA_OUT, is the binary data associated with the output of the encoder 112. In contrast with the first embodiment, a single parameter, W1, is used to define the detection target and to determine the waveform shape at the output of the whitening filter 1400. W1 may be determined dynamically using an LMS algorithm or the may be set statically through the XREG interface. Each of the four blocks of the second embodiment will be described in detail.

Whitening Filter—Overview

Figure 14:
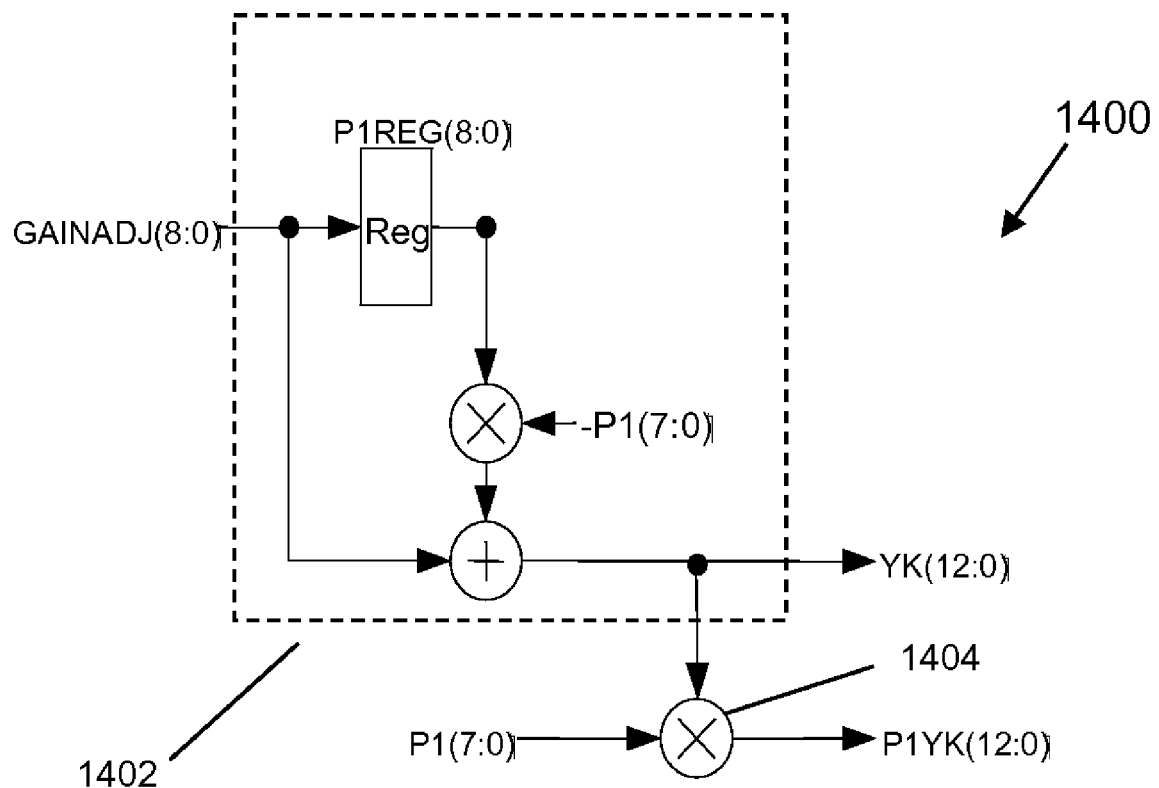
FIG. 14 is a logic diagram of an embodiment of the whitening filter of the detection system of FIG. 13.

A block diagram of the whitening filter 1400 is illustrated in FIG. 14. The input to the whitening filter 1400 is a nine bit word, GAINADJ(8:0). GAINADJ(8:0) represents a sequence of digitized samples from the output of the equalizer 128 that has been equalized to an EPR4 target, "synchronized" with bit locations and gain adjusted. The whitening filter 1400 is preferably a FIR filter 1402 with one programmable 8-bit tap, P1, ranging from +0.996 to −0.996. The initial output of the FIR filter, $y_k$(12:0), originated as a full 19-bit number which is truncated to nine-bits and then sign extended to 13 bits.

One pre-calculation for the NPML detector 400 is also performed by the whitening filter 1400: P1·$y_k$ 1404. Similar to the FIR filter 1402, the multiplier P1 is an eight-bit word and the multiplicand $y_k$ is a nine-bit word. The product generated P1$y_k$(12:0) is a 19-bit number that is first truncated to nine-bits and then sign extended to 13-bits. Truncation is preferably performed with rounding.

Maximum-Likelihood Detector—Log Likelihood Functions

The 16 mathematical equations above describing the 4$^{th}$ order maximum-likelihood detector 400 of the first embodiment may also be used in the detector module 1300 of the second embodiment of the present invention and will not be repeated here.

Maximum-Likelihood Detector—Metric Calculations

Similarly, the 16 metric calculations shown above for the 16-state detector 400 of the first embodiment may also be used with the second embodiment and will not be repeated here.

Maximum-Likelihood Detector—$(1-D^2)(1+D)(1-P_1D)$

The target channel for the 4$^{th}$ order NPML detector for an EPR4 target is:

$$(1-D^2)(1+D)(1-P_1D)=h_0+h_1D+h_2D^2+h_3D^3+h_4D^4$$

where:
$h_0 = 1$
$h_1 = 1 - P_1$
$h_2 = -(1 + P_1)$
$h_3 = P_1 - 1$
$h_4 = P_1$

The 32 mean parameters are based upon all possible combinations of the five h-coefficients. As can be seen in TABLE V below, each of the mean parameters may be derived from the sum/difference of only four terms: 1, 2, P1, and 2P1. Similarly, each of the mean-product calculations ($\mu_{0/0} y_k, \mu_{0/1} y_k \ldots \mu_{15/1} y_k$) may be determined by adding/subtracting four terms: $y_k$, $P1 \cdot y_k$, $2 y_k$, and $2P1 \cdot y_k$. This greatly simplifies the number of multiplications associated with the NPML detector. As noted earlier in the section on the whitening filter 1400, in a hardware implementation the mean-product terms are nine-bits in size and sign extended to 13 bits.

TABLE V

| | |
|---|---|
| $\mu_{0/0} = 0$ | $\mu_{0/1} = h_0 = 1$ |
| $\mu_{1/0} = h_4 = P_1$ | $\mu_{1/1} = h_0 + h_4 = 1 + P_1$ |
| $\mu_{2/0} = h_3 = P_1 - 1$ | $\mu_{2/1} = h_0 + h_3 = P_1$ |
| $\mu_{3/0} = h_3 + h_4 = 2P_1 - 1$ | $\mu_{3/1} = h_0 + h_3 + h_4 = 2P_1$ |
| $\mu_{4/0} = h_2 = -(1 + P_1)$ | $\mu_{4/1} = h_0 + h_2 = -P_1$ |
| $\mu_{5/0} = h_2 + h_4 = -1$ | $\mu_{5/1} = h_0 + h_2 + h_4 = 0$ |
| $\mu_{6/0} = h_2 + h_3 = -2$ | $\mu_{6/1} = h_0 + h_2 + h_3 = -1$ |
| $\mu_{7/0} = h_2 + h_3 + h_4 = P_1 - 2$ | $\mu_{7/1} = h_0 + h_2 + h_3 + h_4 = P_1 - 1$ |
| $\mu_{8/0} = h_1 = 1 - P_1$ | $\mu_{8/1} = h_0 + h_1 = 2 - P_1$ |
| $\mu_{9/0} = h_1 + h_4 = 1$ | $\mu_{9/1} = h_0 + h_1 + h_4 = 2$ |
| $\mu_{10/0} = h_1 + h_3 = 0$ | $\mu_{10/1} = h_0 + h_1 + h_3 = 1$ |
| $\mu_{11/0} = h_1 + h_3 + h_4 = P_1$ | $\mu_{11/1} = h_0 + h_1 + h_3 + h_4 = 1 + P_1$ |
| $\mu_{12/0} = h_1 + h_2 = -2P_1$ | $\mu_{12/1} = h_0 + h_1 + h_2 = 1 - 2P_1$ |
| $\mu_{13/0} = h_1 + h_2 + h_4 = -P_1$ | $\mu_{13/1} = h_0 + h_1 + h_2 + h_4 = 1 - P_1$ |
| $\mu_{14/0} = h_1 + h_2 + h_3 = -P_1 - 1$ | $\mu_{14/1} = h_0 + h_1 + h_2 + h_3 = -P_1$ |
| $\mu_{15/0} = h_1 + h_2 + h_3 + h_4 = -1$ | $\mu_{15/1} = h_0 + h_1 + h_2 + h_3 + h_4 = 0$ |

Maximum-Likelihood Detector—Trellis and Path Metric Structure

The VHDL for the metric calculations set forth in Equations 1-16 above and designed into the structures illustrated in FIGS. 4A-4D are equally valid for the second embodiment and will not be repeated here.

Maximum-Likelihood Detector—Metric 0 and 1 Structures

Figure 15A:
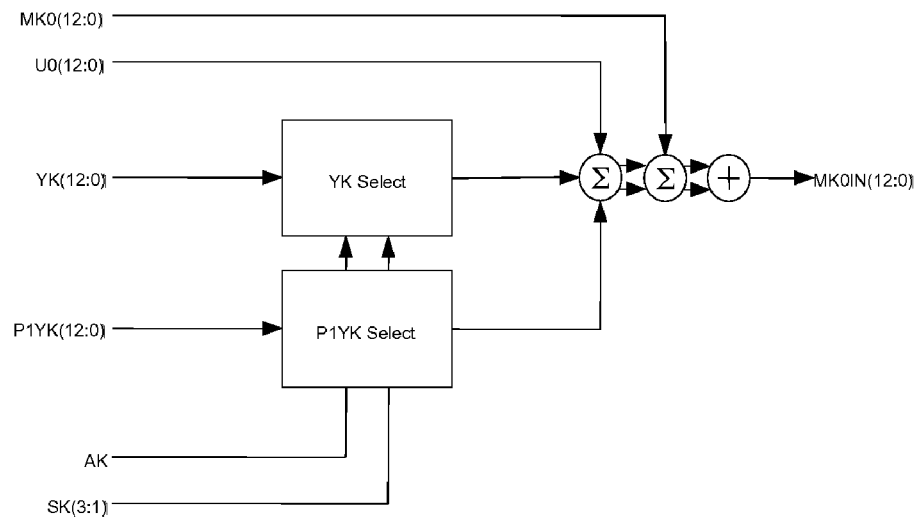
FIGS. 15A and 15B are logic diagrams of the metric 0 and metric 1 structures, respectively, of the second embodiment.
Figure 15B:
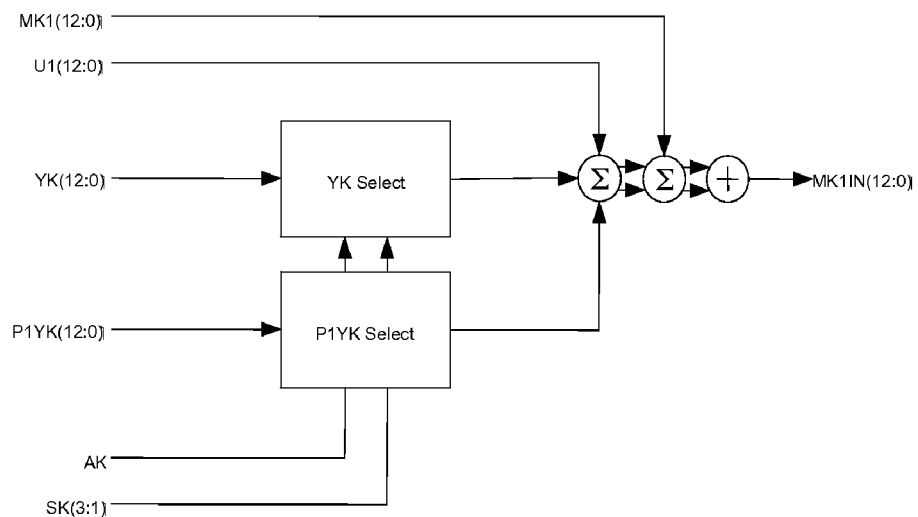
Figure 16:
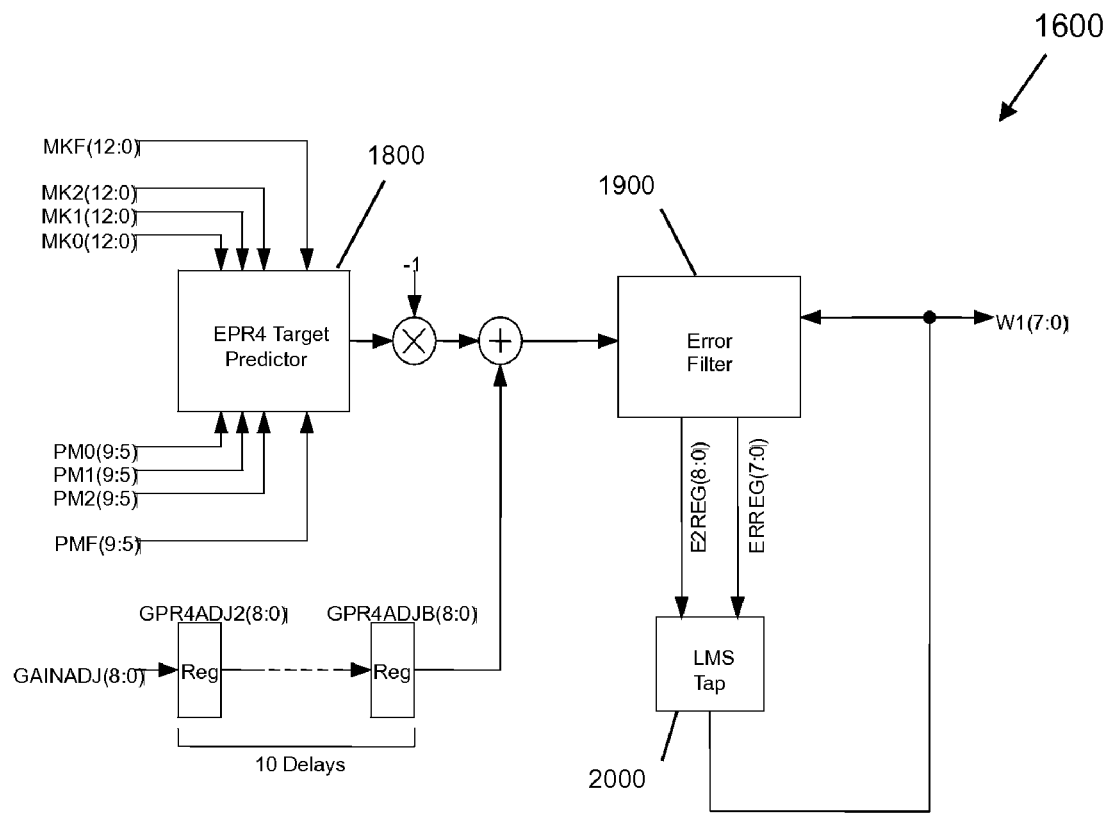
FIG. 16 illustrates a hardware architecture of the LMS engine of FIG. 13.

FIGS. 15A and 15B illustrate the structures of the detector 400 which perform the metric 0 and metric 1 portions, respectively, of Equations 1-16 for the second embodiment. TABLES VI and VII describe the inputs to the structure of FIGS. 15A and 15B, respectively.

TABLE VI

METRIC 0 INPUTS

| Sk/Ak | SK(3:1) | AK | YK Select | P1YK Select | Sk/Ak |
|---|---|---|---|---|---|
| 0/0 | 000 | 0 | 0 | 0 | 0/0 |
| 2/0 | 001 | 0 | -yk | P1yk | 2/0 |
| 4/0 | 010 | 0 | -yk | -P1yk | 4/0 |
| 6/0 | 110 | 0 | -2yk | 0 | 6/0 |
| 8/0 | 100 | 0 | +yk | -P1yk | 8/0 |
| 10/0 | 101 | 0 | 0 | 0 | 10/0 |
| 12/0 | 110 | 0 | 0 | -2P1yk | 12/0 |
| 14/0 | 111 | 0 | -yk | -P1yk | 14/0 |
| 0/1 | 000 | 1 | +yk | 0 | 0/1 |
| 2/1 | 001 | 1 | 0 | P1yk | 2/1 |
| 4/1 | 010 | 1 | 0 | -P1yk | 4/1 |
| 6/1 | 110 | 1 | -yk | 0 | 6/1 |
| 8/1 | 100 | 1 | +2yk | -P1yk | 8/1 |
| 10/1 | 101 | 1 | +yk | 0 | 10/1 |
| 12/1 | 110 | 1 | +yk | -2P1yk | 12/1 |
| 14/1 | 111 | 1 | 0 | -P1yk | 14/1 |

TABLE VII

METRIC 1 INPUTS

| Sk/Ak | SK(3:1) | AK | YK Select | P1YK Select | Sk/Ak |
|---|---|---|---|---|---|
| 1/0 | 000 | 0 | 0 | P1yk | 1/0 |
| 3/0 | 001 | 0 | -yk | 2P1yk | 3/0 |
| 5/0 | 010 | 0 | -yk | 0 | 5/0 |
| 7/0 | 110 | 0 | -2yk | P1yk | 7/0 |
| 9/0 | 100 | 0 | +yk | 0 | 9/0 |
| 11/0 | 101 | 0 | 0 | P1yk | 11/0 |
| 13/0 | 110 | 0 | 0 | -P1yk | 13/0 |
| 15/0 | 111 | 0 | -yk | 0 | 15/0 |
| 1/1 | 000 | 1 | +yk | P1yk | 1/1 |
| 3/1 | 001 | 1 | 0 | 2P1yk | 3/1 |
| 5/1 | 010 | 1 | 0 | 0 | 5/1 |
| 7/1 | 110 | 1 | -yk | P1yk | 7/1 |
| 9/1 | 100 | 1 | +2yk | 0 | 9/1 |
| 11/1 | 101 | 1 | +yk | P1yk | 11/1 |
| 13/1 | 110 | 1 | +yk | -P1yk | 13/1 |
| 15/1 | 111 | 1 | 0 | 0 | 15/1 |

The inputs SK(3:1) and AK are hard-coded in the VHDL for each metric block. It is assumed that the VHDL synthesizer will keep only the logic that is needed for that specific block. Thus, each YK, P1YK, 2YK and P1YK select block will be synthesized into fixed logic structures that do not change over time.

Maximum-Likelihood Detector—Compare and Select Logic

The compare and select logic 600 (FIG. 6) described above may also be used in the detector module 1300 of the second embodiment of the present invention and will not be repeated here.

LMS Engine—Overview

Figure 17:
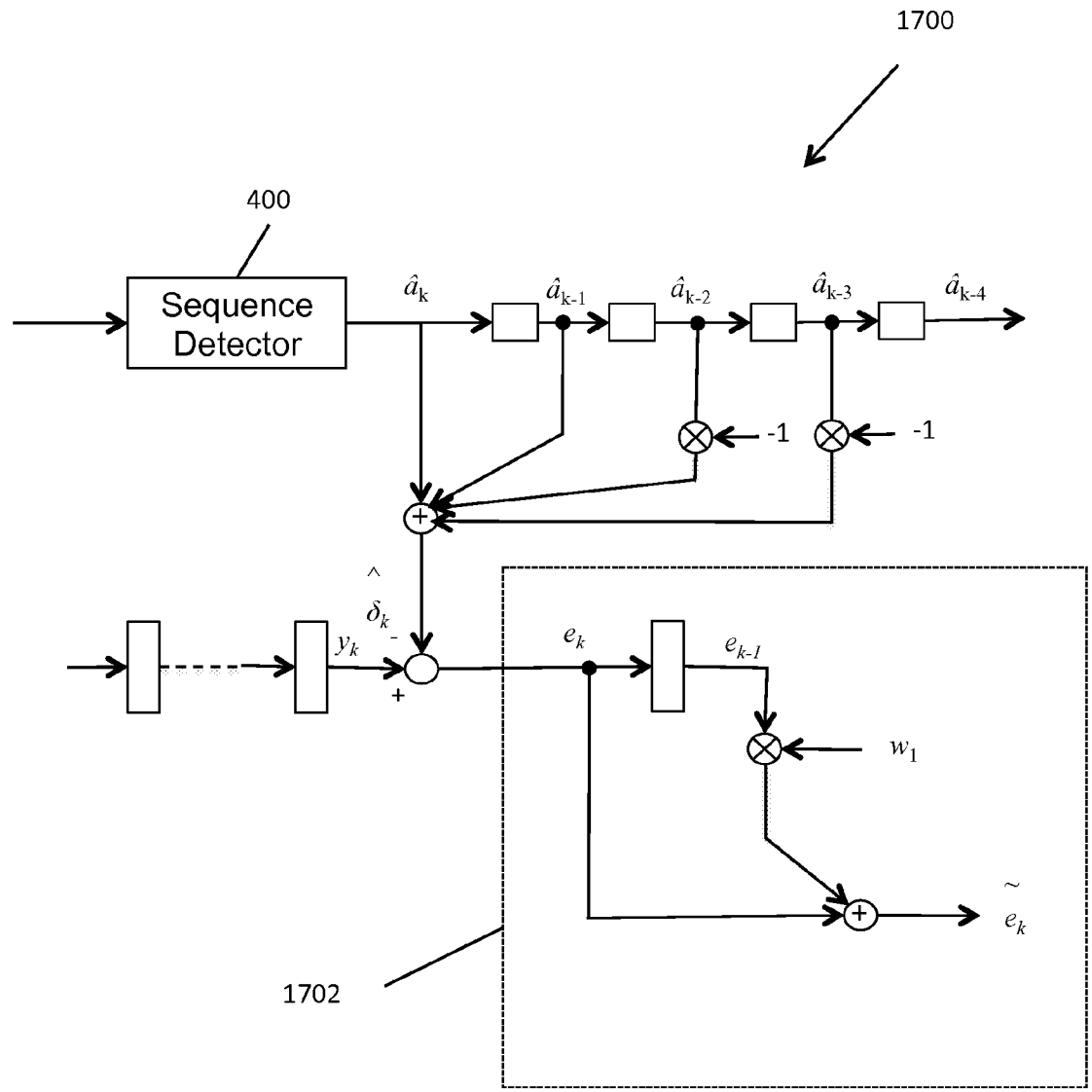
FIG. 17 is a logic diagram of the LMS engine of FIG. 16.

Because different drives and different media have different characteristics, the present invention allows the system 1300 to adapt to the actual read-back signal in the channel 100. The LMS engine 1600 determines the predictor coefficients used to for the adaptive process. The hardware architecture of the LMS engine 1600 is illustrated in FIG. 17. The three main components to the hardware LMS engine 1600 are an EPR4 target and error generator 1800, an error filter 1900 and one LMS tap 2000.

A generalized diagram of the target and error generator 1800 and the error filter 1900 is shown in FIG. 17. The binary sequence ($\hat{a}_k, \hat{a}_{k-1}, \ldots \hat{a}_{k-4}$) is derived from the path memory 600. From the binary sequence, the expected EPR4 samples are derived and compared to the received EPR4 samples to derive an error signal $e_k$. The error signal is filtered through a FIR filter 1702 that matches the whitening filter architecture and produces an output $\tilde{e}_k$. The filter output $\tilde{e}_k$ is input into an LMS tap (not shown in FIG. 17) to generate $w_1$ which is fed back to the FIR filter. As noted in FIG. 17, the coefficients are updated as $w_1 \leftarrow w_1 - \alpha \tilde{e}_k e_{k-1}$ and $w_2 \leftarrow w_2 - \alpha \tilde{e}_k e_{k-2}$.

LMS Engine—EPR4 Target and Error Generation

Figure 18:
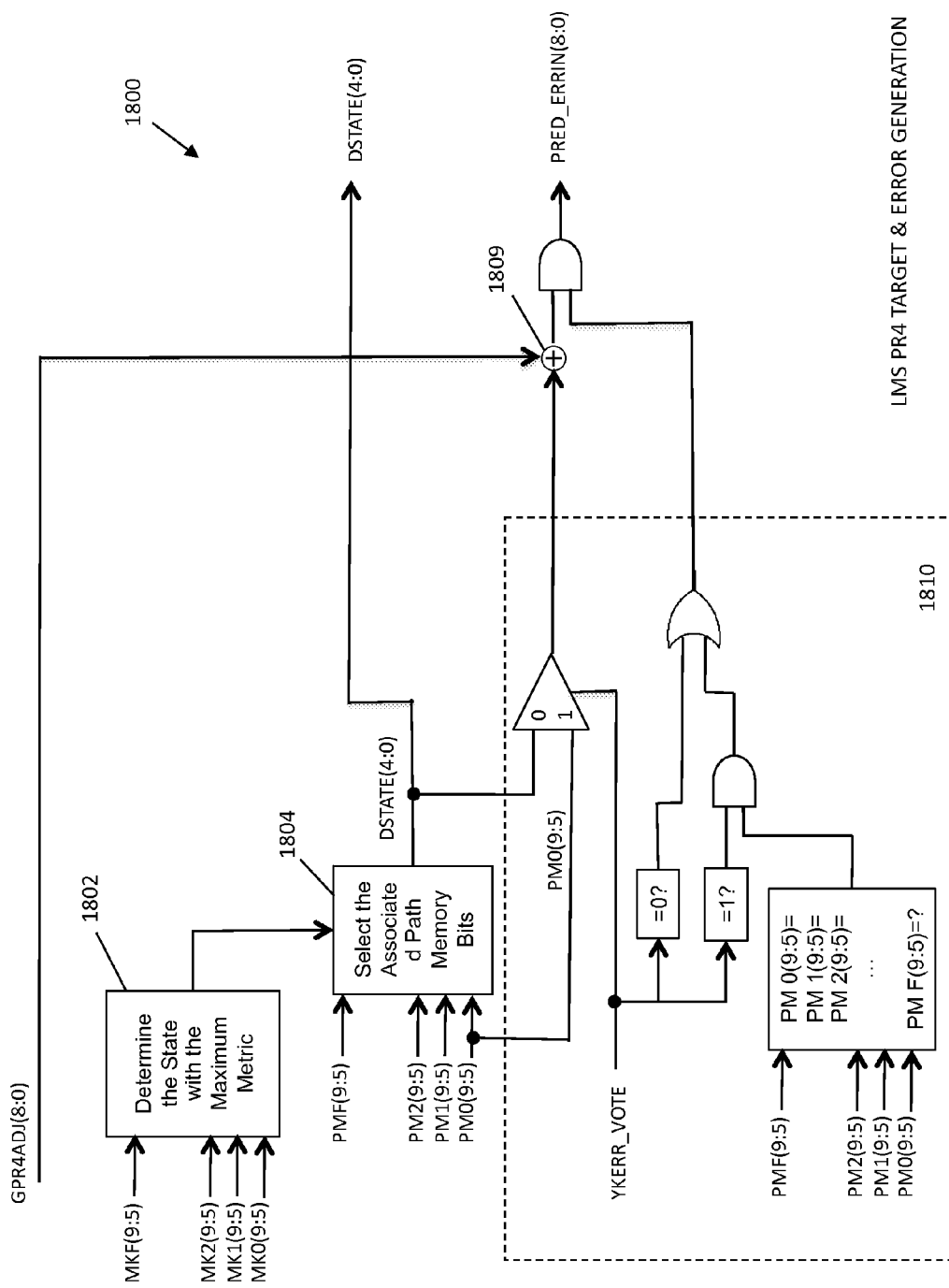
FIG. 18 illustrates an EPR4 target and error generator of the LMS engine of FIG. 16.

The logic associated with target and error generator block 1800 of the LMS engine 1600 is shown in FIG. 18. This function determines the error between the expected EPR4 signal and the received EPR4 signal. The process begins with determining the state with the largest metric 1802; that is, the state that most likely contains the correct binary sequence. This logic comprises a sequence of metric comparisons, comparing metrics two at a time and saving the largest metric and the associated state. Once the state that has the largest metric is identified, the path memory 600 is selected for that state 1804. Each path memory is 32 bits in length with bits five through nine being used as estimates of $\hat{a}_k, \hat{a}_{k-1}, \ldots \hat{a}_{k-4}$. A qualifying circuit 1810 may be included to help prevent false sequences from corrupting the error signal. If enabled by setting YKERR_VOTE=1, then an error will be generated only when all the $\hat{a}_k, \hat{a}_{k-1}, \ldots \hat{a}_{k-4}$ sequence from each of the path memories is identical; that is, where there is unanimous agreement between the path memories on what the received signal is. With the path memory bits, the ideal PR4 signal is reconstructed in the EPR4 target module 1806 and the difference between it and the received EPR4 signal is calculated by multiplier and adder blocks 1808, 1809.

LMS Engine—Error Filter

Figure 19:
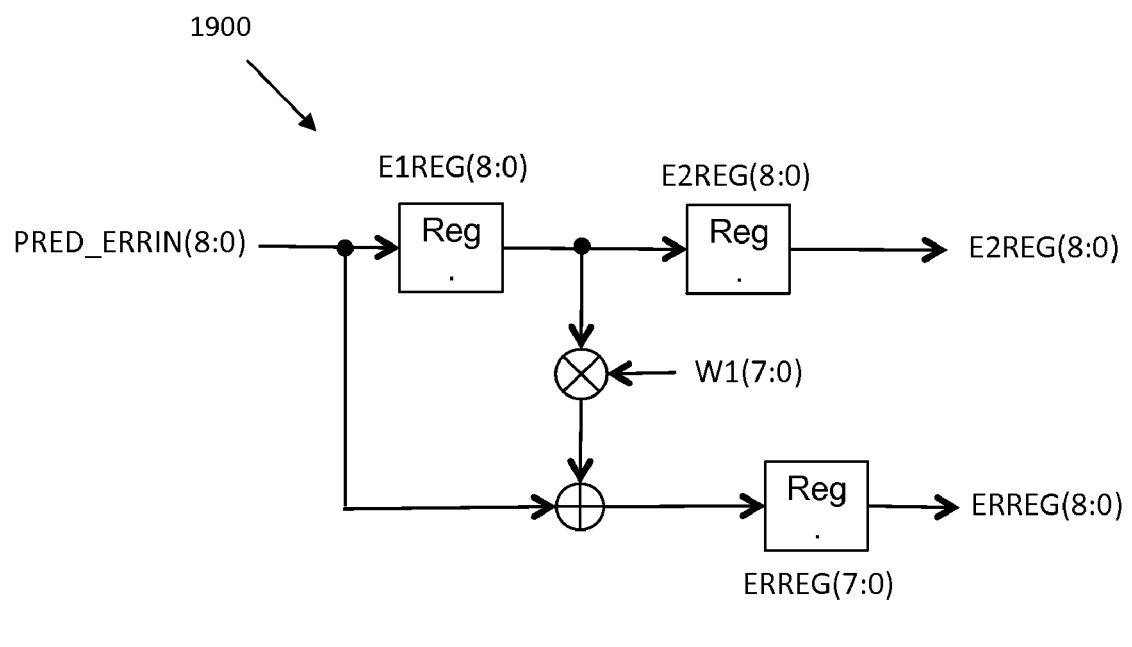
FIG. 19 illustrates an error filter of the LMS engine of FIG. 16.

The error filter 1900 is illustrated in FIG. 19 and is similar to the whitening filter 1400 with the primary difference being an additional register 1902 at the output. The register 1902 breaks the large combinatorial logic blocks into smaller blocks to allow the logic to be run at a higher clock rate.

LMS Engine—LMS Tap

Figure 20:
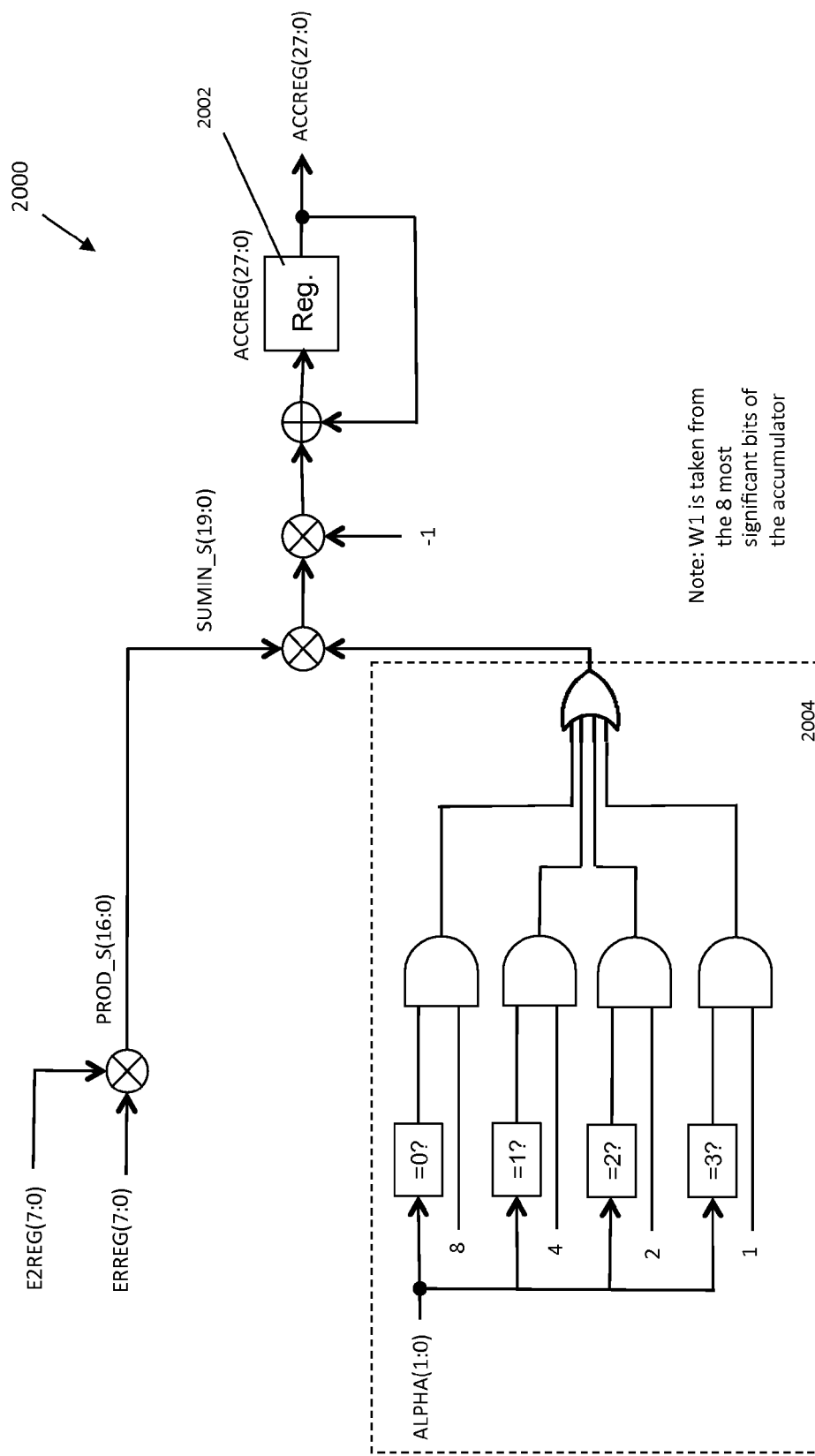
FIG. 20 illustrates the LMS tap logic of the LMS engine of FIG. 16.

The LMS tap 2000 (FIG. 20) is used to generate $w_1$ from the eight most significant bits of the accumulator 2002. The LMS α gain can be selected from one of four binary shifts 2004. $w_1$ is an eight bit word ranging from +0.996 to −0.996. An EPR4 target may be achieved by setting $w_1=0$. The LMS gain values are selected from:

α∈{0.00001544, 0.00003088, 0.00006176, 0.00012352}

Coefficient Engine

Figure 21:
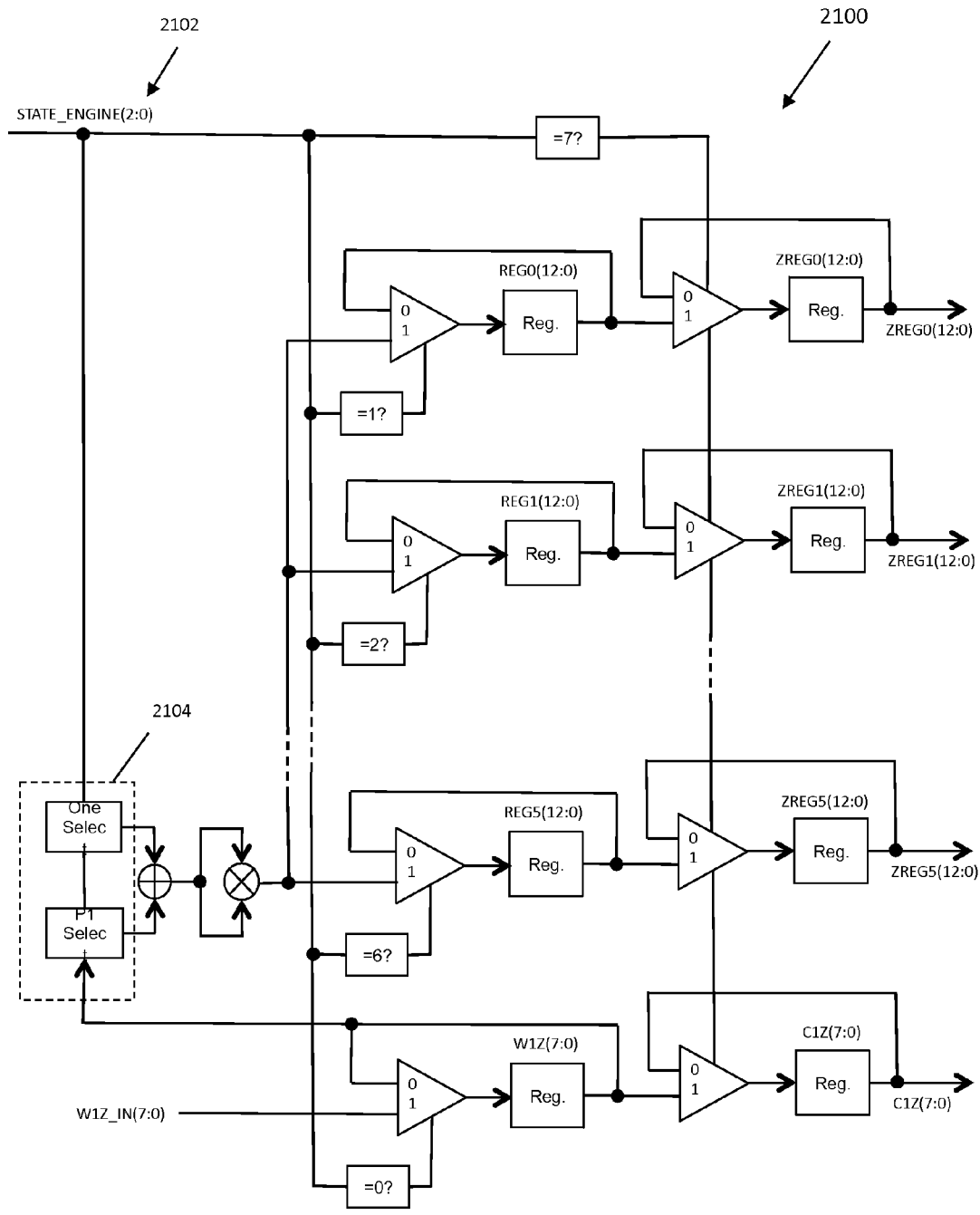
FIG. 21 is a block diagram of the coefficient engine of FIG. 13.

A source select module 202 (FIG. 13) managed by microcode in the tape drive microprocessor allows the coefficient input $w_1$ for the coefficient engine 2100 (FIG. 21) to be dynamically determined by the LMS engine 1600 or established by the microcode through register values. One value is available in the event that the LMS engine adapts to the wrong value. There may also be a condition in which it is preferable to disable the adaptation function and operate with fixed values. In the section above describing the metric calculations, there are 32 multiplication operations associated with the mean-squared parameters ($\mu_{0/0}^2$ through $\mu_{15/1}^2$) for a given set of predictor coefficients. When the whitening filter 1400 of the present invention is used, the number of unique multiplications associated with the mean-squared parameters may be reduced to only six:

1. $P_1^2$
2. $(P_1-1)^2$
3. $4P_1^2$
4. $(P_1-2)^2$
5. $(2P_1-1)^2$
6. $(1+P_1)^2$

The calculations may be performed in parallel. Alternatively, the number of multiplications performed at one time may be further reduced to one if the mean-squared terms are calculated sequentially. This employs a small state machine to select at most two inputs to an adder and squaring block. The results are saved as they are calculated (REG0-REG8) and then all of the mean-squared terms (ZREG0-ZREG8) plus $P_1$ are sent to the detector 400 and whitening filter 1400, preferably simultaneously.

TABLE IV presents the status of the outputs of the P1 Select, and One Select for each of the seven possible states of the State_Engine.

TABLE VIII

| STATE_ENGINE(3:0) | P1 Select | One Select | Output | Register |
|---|---|---|---|---|
| 1 | P1 | 0 | $P_1^2$ | ZREG0(12:0) |
| 2 | P1 | −1 | $(P_1-1)^2$ | ZREG1(12:0) |
| 3 | 2P1 | 0 | $4P_1^2$ | ZREG2(12:0) |
| 4 | P1 | −2 | $(P_1-2)^2$ | ZREG3(12:0) |
| 5 | 2P1 | −1 | $(2P_1-1)^2$ | ZREG4(12:0) |
| 6 | P1 | +1 | $(1+P_1)^2$ | ZREG5(12:0) |
| 0 | | | $P_1$ | C1Z(7:0) |

It is important to note that while the present invention has been described in the context of a fully functioning data processing system, those of ordinary skill in the art will appreciate that the processes of the present invention are capable of being distributed in the form of a computer storage readable medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for improved data detection or a method for deploying computing infrastructure comprising integrating computer readable code into a computing system for improved data detection.

What is claimed is:

1. A detection system for a data storage system, comprising:
   a whitening filter, having:
      a first programmable tap P1;
      a first input for receiving a synchronized and gain adjusted sequence of digitized data samples from an equalizer;
      a first output yk;
      a second output P1*yk;
   a 16-state noise predictive, maximum-likelihood (NPML) detector module, having:
      first and second inputs for receiving the first and second outputs from the whitening filter;
      a plurality of first outputs ak, ak-1, ak-2, ak-3, ak-4 representing a binary sequence from a path memory; and
      a data output;
   a least means square (LMS) engine for determining predictor coefficients, having:
      a plurality of first inputs for receiving the plurality of first outputs from the NPML detector module; and
      a first predictor coefficient output w1; and
   a coefficient engine having:
      a first input for receiving the first predictor coefficient output w1 from the LMS engine;
      a plurality of first register outputs ZREG0-ZREG8; and
      a second register output C1Z;
   the whitening filter further having a second input for receiving the second register output from the coefficient engine; and the NPML detector module further having a third input for receiving the second register output from the coefficient engine.

2. The detection system of claim 1, wherein the NPML detector module has an EPR4 target.

3. The detection system of claim 2, the whitening filter comprising a FIR filter.

4. The detection system of claim 2, the NPML detector module comprising a 4th order maximum-likelihood detector having a channel target of:

$$(1-D^2)(1+D)(1-P_1D)=h_0+h_1D+h_2D^2+h_3D^3+h_4D^4.$$

5. The detection system of claim 2, the LMS engine comprising:
 a EPR4 target and error generator having the first plurality of inputs of the LMS engine;
 an error filter for receiving an output from the target and error generator and determining a predicted error; and
 a first LMS tap for receiving the predicted error from the error filter and having the first predictor coefficient output $w1$, the first predictor coefficient output $w1$ also being input into the error filter.

6. The detection system of claim 1, wherein the NPML detector module has a PR4 target.

7. The detection system of claim 6, wherein:
 the whitening filter further comprises:
  a second programmable tap P2; and
  a third output P2*yk;
 the NPML detector module further comprises a third input for receiving the third output from the whitening filter;
 the LMS engine further comprises a second predictor coefficient output, $w2$; and
 the coefficient engine further comprises:
  a second input for receiving the second predictor coefficient output $w2$ from the LMS engine; and
  a second register output C1Z.

8. A read channel for a data storage device, comprising:
 an automatic gain control (AGC) having a first input coupled to receive an analog data signal from a read head;
 a low pass filter (LPF) having an input coupled to receive an output from the AGC;
 a gain controller having an input coupled to receive an output from the LPF and having an output coupled to a second input of the AGC;
 an analog to digital converter (ADC) having a first input coupled to receive the output from the LPF;
 a equalizer having an input coupled to receive an output from the ADC;
 a timing controller having an input coupled to receive an output from the equalizer and having an output coupled to a second input of the ADC;
 a detector having an input coupled to receive the output from the equalizer; and
 a decoder having an input coupled to receive an output from the detector and having a read data output;
 the detector comprising:
  a whitening filter, having:
   a first programmable tap P1;
   a first input for receiving a synchronized and gain adjusted sequence of digitized data samples from an equalizer;
   a first output yk; and
   a second output P1*yk;
  a 16-state noise predictive, maximum-likelihood (NPML) detector module, having:
   first and second inputs for receiving the first and second outputs from the whitening filter;
   a plurality of first outputs ak, ak-1, ak-2, ak-3, ak-4 representing a binary sequence from a path memory; and
   a data output;
  a least means square (LMS) engine for determining predictor coefficients, having:
   a plurality of first inputs for receiving the plurality of first outputs from the NPML detector module; and
   a first predictor coefficient output $w1$; and
  a coefficient engine having:
   a first input for receiving the first predictor coefficient output $w1$ from the LMS engine;
   a plurality of first register outputs ZREG0-ZREG8; and
   a second register output C1Z;
  the whitening filter further having a second input for receiving the second register output from the coefficient engine; and
  the NPML detector module further having a third input for receiving the second register output from the coefficient engine.

9. The read channel of claim 8, wherein the NPML detector module has an EPR4 target.

10. The read channel of claim 9, the whitening filter comprising a FIR filter.

11. The read channel of claim 9, the NPML detector module comprising a 4th order maximum-likelihood detector having a channel target of:

$$(1-D^2)(1-P_1D-P_2D^2)=h_0+h_1D+h_2D^2+h_3D^3+h_4D^4.$$

12. The read channel of claim 9, the LMS engine comprising:
 a EPR4 target and error generator having the first plurality of inputs of the LMS engine;
 an error filter for receiving an output from the target and error generator and determining a predicted error; and
 a first LMS tap for receiving the predicted error from the error filter and having the first predictor coefficient output $w1$, the first predictor coefficient output $w1$ also being input into the error filter.

13. The read channel of claim 8, wherein the NPML detector module has a PR4 target.

14. The read channel of claim 13, wherein:
 the whitening filter further comprises:
  a second programmable tap P2; and
  a third output P2*yk;
 the NPML detector module further comprises a third input for receiving the third output from the whitening filter;
 the LMS engine further comprises a second predictor coefficient output, $w2$; and
 the coefficient engine further comprises:
  a second input for receiving the second predictor coefficient output $w2$ from the LMS engine; and
  a second register output C1Z.

* * * * *